United States Patent
Brugner et al.

(10) Patent No.: US 8,325,454 B2
(45) Date of Patent: Dec. 4, 2012

(54) OVER HEATING DETECTION AND INTERRUPTER CIRCUIT

(75) Inventors: Frank S. Brugner, Clearwater, FL (US); Thomas S. Williams, Clearwater, FL (US)

(73) Assignee: Technology Research Corporation, Clearwater, FL (US)

( * ) Notice: Subject to any disclaimer, the term of this patent is extended or adjusted under 35 U.S.C. 154(b) by 282 days.

(21) Appl. No.: 12/384,624

(22) Filed: Apr. 7, 2009

(65) Prior Publication Data

US 2009/0251832 A1 Oct. 8, 2009

Related U.S. Application Data

(60) Provisional application No. 61/123,288, filed on Apr. 7, 2008.

(51) Int. Cl.
  *H02H 3/00* (2006.01)
(52) U.S. Cl. .................. 361/103; 361/42
(58) Field of Classification Search .............. 361/106, 361/103, 25, 27, 105, 670, 42
  See application file for complete search history.

(56) References Cited

U.S. PATENT DOCUMENTS

| | | | |
|---|---|---|---|
| 3,872,355 A * | 3/1975 | Klein et al. | 361/45 |
| 4,310,837 A * | 1/1982 | Kornrumpf et al. | 340/598 |
| 4,470,711 A * | 9/1984 | Brzozowski | 374/179 |
| 5,590,010 A * | 12/1996 | Ceola et al. | 361/93.4 |
| 5,600,306 A * | 2/1997 | Ichikawa et al. | 340/584 |
| 5,862,030 A * | 1/1999 | Watkins et al. | 361/103 |
| 5,930,097 A * | 7/1999 | Ceola et al. | 361/103 |
| 5,945,903 A * | 8/1999 | Reddy et al. | 337/197 |
| 6,210,036 B1* | 4/2001 | Eberle et al. | 374/141 |
| 6,707,652 B2* | 3/2004 | Engel | 361/42 |
| 7,508,642 B2* | 3/2009 | Ye | 361/103 |
| 8,139,337 B2* | 3/2012 | Baxter et al. | 361/103 |
| 2002/0097546 A1* | 7/2002 | Weinberger | 361/103 |
| 2006/0098371 A1* | 5/2006 | Wambsganss et al. | 361/103 |
| 2007/0139842 A1* | 6/2007 | De' Longhi | 361/103 |
| 2010/0277325 A1* | 11/2010 | Kopelman | 340/595 |

* cited by examiner

*Primary Examiner* — Danny Nguyen
(74) *Attorney, Agent, or Firm* — Frijouf, Rust & Pyle P.A

(57) ABSTRACT

An over heating detection circuit and an interrupter circuit are disclosed for interrupting electrical power from a power source receptacle to a load upon the detection of an over heating condition of an electrical plug. A heat sensitive device monitors the temperature of the electrical plug. The over heating detection circuit is connected to the heat sensitive device for detecting an over heated condition in the electrical plug. The interruption circuit includes a disconnect switch connected to the over heating detection circuit for disconnecting electrical power upon the detection of the over heated condition in the electrical plug.

15 Claims, 18 Drawing Sheets

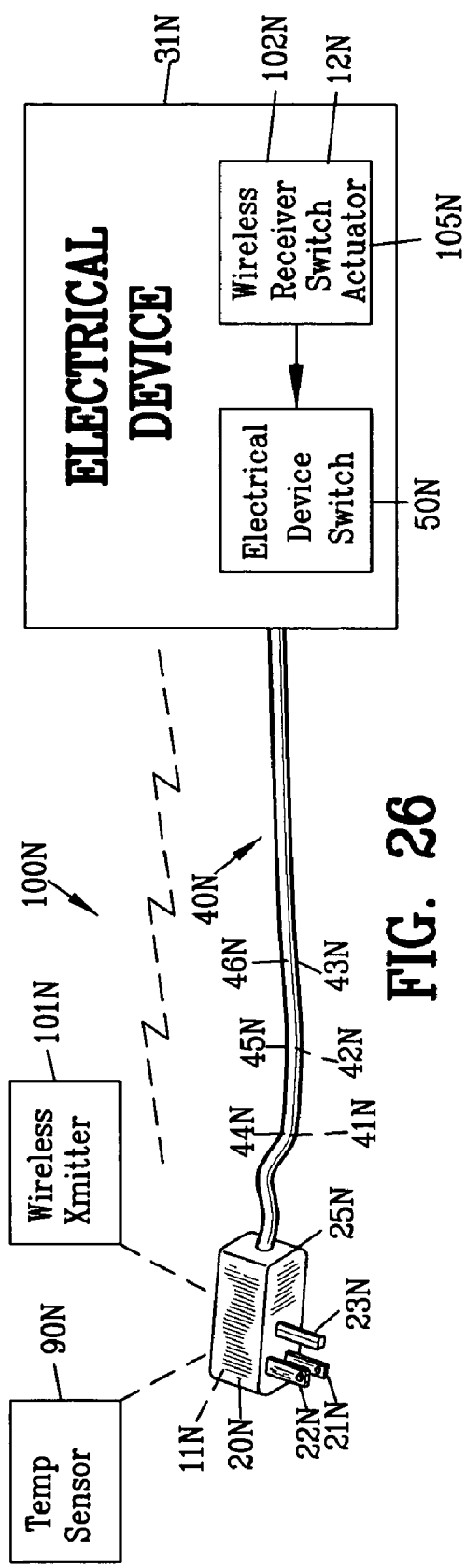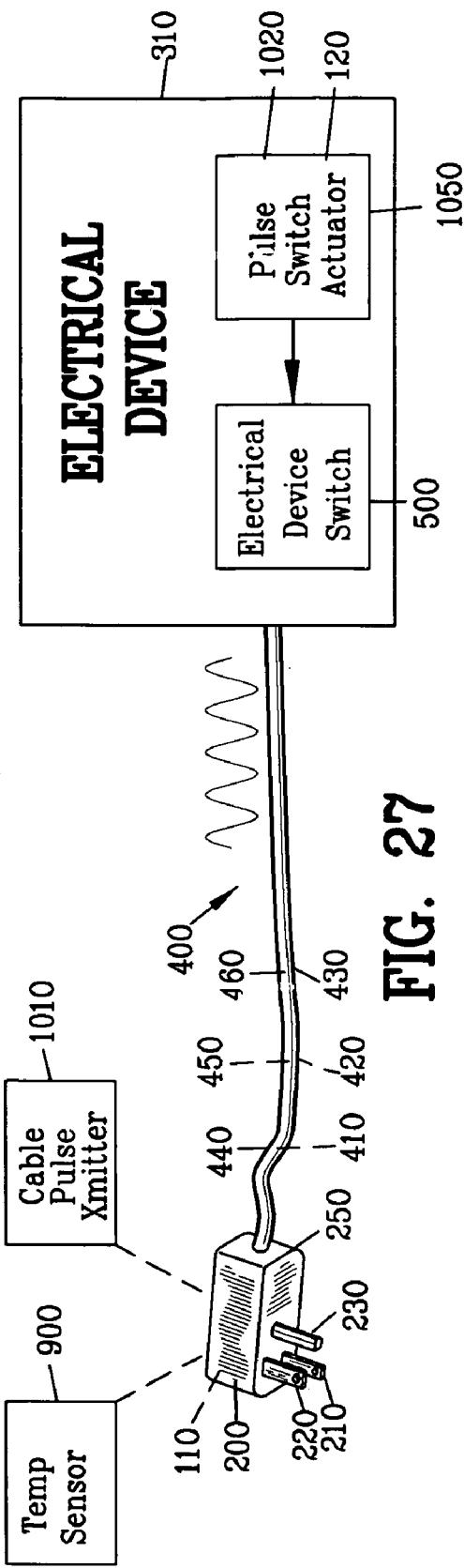

OVER HEATING DETECTION AND INTERRUPTER CIRCUIT

CROSS-REFERENCE TO RELATED APPLICATIONS

This application claims benefit of U.S. Patent Provisional application No. 61/123,288 filed Apr. 7, 2008. All subject matter set forth in provisional application No. 61/123,288 filed Apr. 7, 2008 is hereby incorporated by reference into the present application as if fully set forth herein.

BACKGROUND OF THE INVENTION

1. Field of the Invention

This invention relates to electricity and more particularly to an over heating detection circuit for disconnecting electrical power upon the detection of the over heated condition in an electrical plug.

2. Background of the Invention

The most common method of connecting an electrical appliance to an electric power source is through the use of an electrical power plug inserted into an electrical power source receptacle. The electrical power plug includes a first and a second electrical blade for insertion within a first and a second slot of the power source receptacle. The first and second electrical blades are retained within the first and second slots of the electrical power source receptacle by a resilient slot connector located within the first and second slots of the electrical power source receptacle. The resilient slot connectors located within the first and second slot provides a mechanical engagement between the resilient slot connectors and the inserted first and second electrical blades to enable a low resistance electrical contact therebetween.

In many cases, the mechanical and/or electrical contact between one of the resilient slot connectors and the inserted first and second electrical blades deteriorates thus raising the electrical resistance of the electrical contact therebetween. This deterioration of the mechanical and/or electrical contact between one of the resilient slot connectors and the inserted first and second electrical blades may be caused by a number of reasons.

The deterioration between one of the resilient slot connectors and the inserted electrical blade may be caused by corrosion of either the resilient slot connector and/or the inserted electrical blade. The corrosion of either the resilient slot connector and/or the inserted electrical blade results in an increase in electrical resistance therebetween. Furthermore, the deterioration between one of the resilient slot connectors and the inserted electrical blade may be caused by may be caused by a loss of resiliency of the resilient slot connectors. The loss of resiliency of the resilient slot connector reduces the mechanical contact between the resilient slot connector and the inserted electrical blade thus raising the electrical resistance of the electrical contact therebetween. In some instances, the mere aging of the electrical power plug and/or electrical power source receptacle may cause a loss of resiliency of the resilient slot connector as well as the corrosion of either the resilient slot connector and/or the inserted electrical blade.

The increase in resistance between the resilient slot connector and/or the inserted electrical blade results in an increase in heat during current conduction through the electrical contact between the resilient slot connector and the inserted electrical blade. The increase in heat further increases the resistance of the electrical contact between the resilient slot connector and the inserted electrical blade resulting in a progressive increase in heat and a progressive increase in electrical resistance. Ultimately, the progressive increase in heat will result in heat, smoking and possibly ignition of the electrical power source receptacle and/or the electrical power plug. Such an ignition may spread to adjacent areas causing loss of property and possibly the loss of life.

Therefore, it is an object of the present invention to provide an improved over heating detection circuit for disconnecting electrical power upon the detection of the over heated condition in an electrical plug.

Another object of this invention is to provide an improved over heating detection circuit cooperating with a disconnection circuit that is located within the electrical plug.

Another object of this invention is to provide an improved over heating detection circuit cooperating with a disconnection circuit located in a leakage current detector interrupter circuit (LCDI).

Another object of this invention is to provide an improved over heating detection circuit cooperating with a disconnection circuit located in a ground fault circuit interrupter (GFCI).

Another object of this invention is to provide an improved over heating detection circuit cooperating with a disconnection circuit that does not appreciably increase the cost to the disconnection circuit.

Another object of this invention is to provide an improved over heating detection circuit incorporated into a combined electrical plug and electrical socket for providing over heating detection protection for a conventional electrical plug.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention comprises an improved over heating detection and interrupter circuit for interrupting electrical power from a power source receptacle upon the detection of an over heating condition of an electrical plug. A heat sensitive device monitors the temperature of the electrical plug. An over heating detection circuit is connected to the heat sensitive device for detecting an over heated condition in the electrical plug. An interruption circuit having a disconnect switch is connected to the over heating detection circuit for disconnecting electrical power upon the detection of the over heated condition in the electrical plug.

In another example, the invention relates to an improved over heating detection and interrupter circuit for interrupting electrical power from a power source receptacle to a load upon the detection of an over heating condition of an electrical plug inserted into the power source receptacle. The over heating detection and interrupter circuit comprises a heat sensitive device located in the electrical plug for monitoring the temperature of the electrical plug.

An over heating detection circuit is connected to the heat sensitive device for detecting an over heated condition in the electrical plug. An interruption circuit having a disconnect switch is connected to the over heating detection circuit for disconnecting electrical power upon the detection of the over heated condition in the electrical plug.

In a more specific embodiment of the invention, the electrical plug comprises an electrical plug housing supporting a first and a second electrical blade for insertion within a first and a second slot of the power source receptacle. A heat sensitive device comprises a first and second heat sensitive device located in thermal contact with the first and second electrical blades. Preferably, the heat sensitive device comprises a heat sensitive device.

The disconnect switch comprises a disconnect switch input circuit connect to the power source and a disconnect switch output circuit connected to the load. In one example, a heat sensitive device switch is connected in series with the heat sensitive device for connecting and disconnecting power to the heat sensitive device. The heat sensitive device is connected to the disconnect switch input circuit for powering the heat sensitive device heat. In the alternative, the heat sensitive device is connected to the disconnect switch output circuit for powering the heat sensitive device. In a further alternative, an optocoupler and heat sensitive device switch is located on opposed sides of the heat sensitive device.

In one embodiment, the invention is incorporated into an over heating detection and interrupter circuit for interrupting electrical power from a power source receptacle to a load upon the detection of an over heating condition of an electrical plug inserted into the power source receptacle. The over heating detection and interrupter circuit comprises an electrical plug housing supporting a first and a second electrical blade for insertion within a first and a second slot of the power source receptacle. A first and a second heat sensitive device is located in thermal contact with the first and second electrical blades for monitoring the temperature of each of the first and second electrical blades. An over heating detection circuit is connected to the first and second heat sensitive devices for providing an over heating detection circuit output upon the detection of an over heated condition in one of the first and second electrical blades. An interruption circuit having a disconnect switch is connected for receiving the over heating detection circuit output for disconnecting electrical power to the load upon the over heating detection circuit detecting an over heated condition in one of the first and second electrical blades.

In one example, the disconnect switch is located internal the electrical plug housing. In another example, the disconnect switch is located external the electrical plug housing. In a further example, each the first and second heat sensitive devices has plural power terminals. One of the plural power terminals of the first heat sensitive device is connected to the first electrical blade and one of the plural power terminals of the second heat sensitive device is connected to the second electrical blade.

In another embodiment, the invention is incorporated into an electrical plug enclosing an over heating detection circuit for connection to an interruption circuit for interrupting electrical power from a power source receptacle to a load upon the detection of an over heating condition of the electrical plug inserted into the power source receptacle. The electrical plug enclosing an over heating detection circuit comprises an electrical plug housing supporting a first and a second electrical blade for insertion within a first and a second slot of the power source receptacle. A first and a second heat sensitive device is located in thermal contact with the first and second electrical blades for sensing the temperature of each of the first and second electrical blades. A plurality of conductors connect the first and second heat sensitive devices to the interruption circuit for interrupting electrical power from the power source receptacle to the load upon the over heating detection circuit detecting an over heated condition in one of the first and second electrical blades.

In a further embodiment, the invention is incorporated into a fault detection and interruption circuit for disconnecting electrical power from a power source receptacle to a load upon the detection of a ground fault or a leakage fault condition occurring between an electrical plug inserted into the power source receptacle and the load. The improvement comprises an over heating detection circuit including a heat sensitive device located in the electrical plug for monitoring the temperature of the electrical plug. A conductor interconnects the over heating detection circuit to the fault detection and interruption circuit for disconnecting electrical power upon the detection of the over heated condition in the electrical plug.

In still a further embodiment, the invention is incorporated into a device for providing over heating protection for a conventional electrical plug electrically connected to a power source receptacle. The device comprises a housing having electrical lugs extending from the housing for insertion into the power source receptacle. The housing has an electrical socket defined within the housing for receiving the conventional electrical plug. An interruption circuit has a disconnect switch located internal to the housing interconnecting the electrical lugs to the electrical socket of the housing. An electrical lug heat sensitive device is located in the housing for monitoring the temperature of the electrical lugs of the housing. An electrical socket heat sensitive device is located in the housing for monitoring the temperature of the electrical socket of the housing. An over heating detection circuit is connected to the electrical lug and the electrical socket heat sensitive devices for detecting an over heated condition in the electrical lugs and the electrical socket of the housing. The over heating detection circuit is connected to the interruption circuit for opening the disconnect switch upon the detection of an over heated condition in the electrical lugs and the electrical socket of the housing.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which:

FIG. 26 is an twelfth embodiment of an over heating detection and interrupter circuit of the present invention incorporating a wireless network; and FIG. 27 is an thirteenth embodiment of an over heating detection and interrupter circuit of the present invention incorporated into a pulse network.

Similar reference characters refer to similar parts throughout the several Figures of the drawings.

DETAILED DISCUSSION

Figure 1:
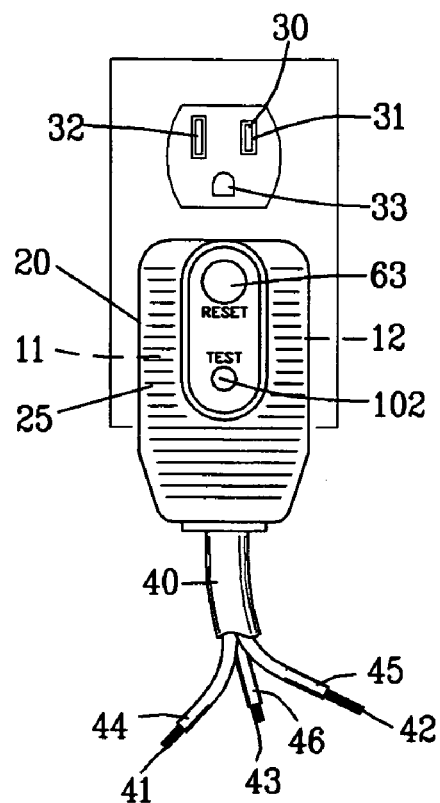
FIG. 1 is an elevational view of an electrical plug incorporating the present invention inserted into a power source receptacle.

FIG. 1 illustrates the over heating detection circuit 11 and an interruption circuit 12 of the present invention incorporated into an electrical plug 20. The over heating detection circuit 11 and an interruption circuit 12 disconnects power from a power source upon the detection of an over heated condition in the electrical plug 20. In this example, the electrical plug 20 includes a plug housing 25 for receiving the over heating detection circuit 11 and the interruption circuit 12 within the plug housing 25. The power source is shown as a conventional 120 volt United States power source receptacle 30

The electrical plug 20 is shown as a conventional 120 volt United States electrical plug 20 inserted into a conventional 120 volt power source receptacle 30. Although the electrical plug 20 has been shown as a conventional 120 volt United States electrical plug, it should be understood that the present invention can be used with the 240 volt United States electrical plug or a foreign electrical plug and the like.

Figure 2:
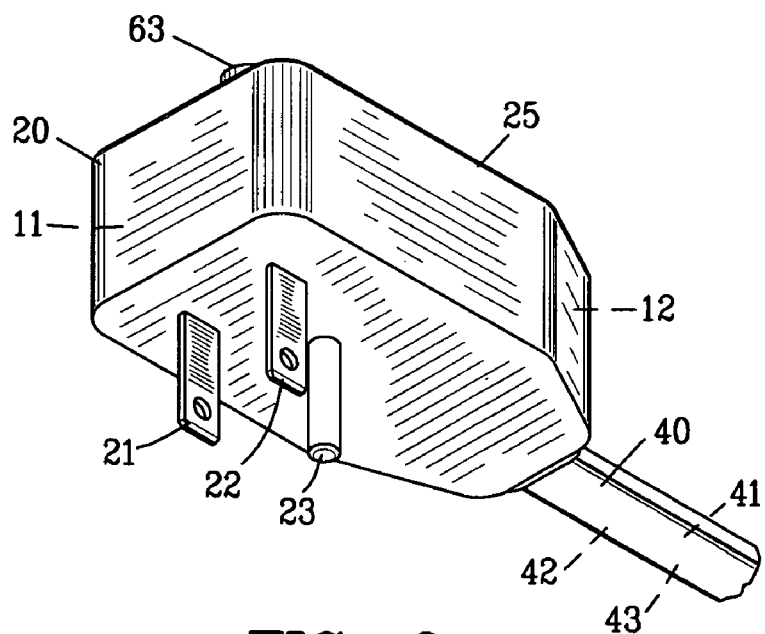
FIG. 2 is an enlarged isometric view of the electrical plug of FIG. 1.

FIG. 2 is an enlarged isometric view of the electrical plug 20 of FIG. 1. The electrical plug 20 includes a first and a second electrical blade 21 and 22 and a ground lug 23. The first electrical blade 21 is the line terminal whereas the second electrical blade 22 is the neutral terminal. The electrical plug 20 is connected to a wire assembly 40 within the plug housing 25 of the electrical plug 20.

The first and second electrical blades 21 and 22 are connected to a first and a second conductor 41 and 42 of the wire assembly 40 through the interruption circuit 12. The ground lug 23 is connected directly to a ground conductor 43 of the wire assembly 40. Although the electrical plug 20 has been shown to include the ground lug 23, it should be understood that the present invention can be used with an electrical plug 20 having only the first and second electrical blades 21 and 22.

Referring back to FIGS. 1 and 2, the first and second electrical blades 21 and 22 and the ground lug 23 extend from the plug housing 25 for insertion into the first and a second electrical slot 31 and 32 and a ground aperture 33 of the electrical receptacle 30. Each of the first and second electrical slots 31 and 32 and the ground aperture 33 of the conventional electrical receptacle 30 includes resilient slot connectors (not shown) for providing a resilient mechanical engagement with the first and second electrical blades 21 and 22 and the ground lug 23. Typically, the resilient slot connectors (not shown) comprise a resilient metallic connector as should be well known to those skilled in the electrical art.

Figure 3:
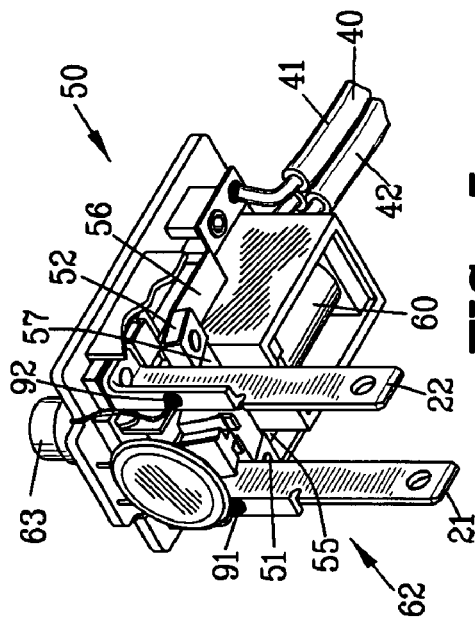
FIG. 3 is an interior view of electrical plug of FIG. 2 with a disconnect switch shown in a closed position.

FIG. 3 is an interior view of electrical plug 20 of FIG. 2 with a disconnect switch 50 of the interruption circuit 12 shown in a closed position. The ground lug 23 is not shown for the purpose of clarity of the drawing. In this example, the disconnect switch 50 comprises a first and a second switch 51 and 52 shown as resilient relay contacts 51 and 52 mounted on resilient metallic conductors 55 and 56. The resilient metallic conductors 55 and 56 bias the first and second switches 51 and 52 into an open position.

Figure 4:
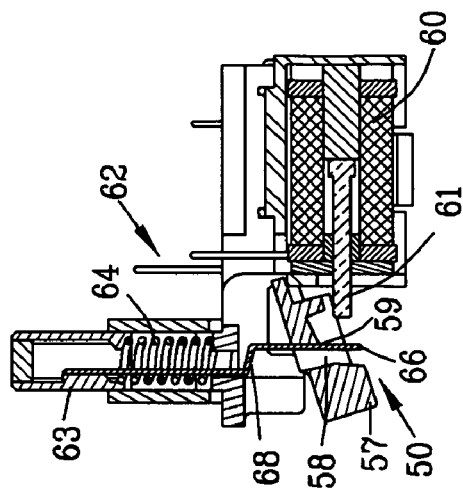
FIG. 4 is an enlarged sectional view of the disconnect switch of FIG. 3.

FIG. 4 is an enlarged sectional view of the disconnect switch 50 of FIG. 3. An insulating switch operator 57 interconnects the first and second switches 51 and 52 for moving the first and second switches 51 and 52 in unison. The insulating switch operator 57 includes an aperture 58 defining a shoulder 59. The disconnect switch 50 includes a solenoid coil 60 for operating a plunger 61. The plunger 61 is located for movement adjacent to the aperture 58 in the insulating switch operator 57.

The latch 62 is shown as a mechanical latch comprising a reset button 63 having a return spring 64. The reset button 63 extends from the housing 20 as shown in FIGS. 1 and 2. A latch bar 66 having a latch shoulder 68 is connected to the reset button 63.

FIGS. 3 and 4 illustrate the disconnect switch 50 in the closed position. The latch shoulder 68 of the latch bar 66 engages with the shoulder 59 defined by the aperture 58 of the switch operator 57. The return spring 64 is selected to be stronger than the resilient metallic conductors 55 and 56 biasing the first and second switches 51 and 52 into an open position. The return spring 64 retains the first and second switches 51 and 52 in the closed position against the urging of the resilient metallic conductors 55 and 56.

Figure 5:
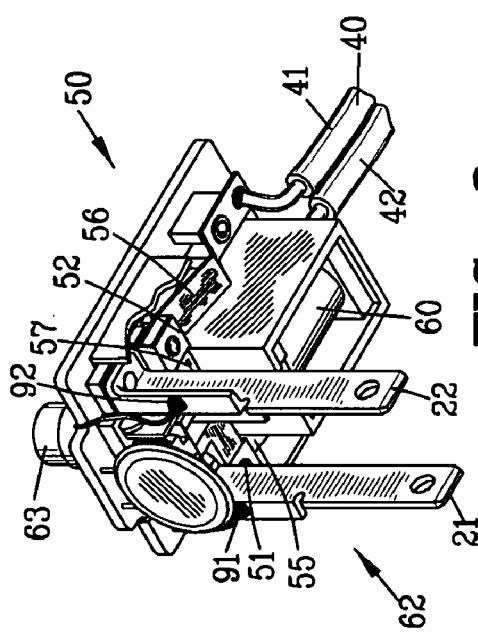
FIG. 5 is a view similar to FIG. 3 with the disconnect switch shown in an open position.
Figure 6:
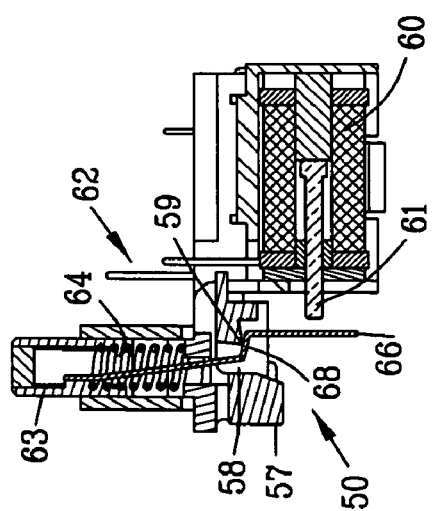
FIG. 6 is an enlarged sectional view of the disconnect switch of FIG. 5.

FIGS. 5 and 6 illustrate the disconnect switch 50 in an open position. An electrical current through the solenoid coil 60 extends the plunger 61 to displace the latch bar 66. The plunger 61 displaces the latch bar 66 to disengage the latch shoulder 68 of the latch bar 66 from the shoulder 57 of the switch operator 55. The disengagement of the latch shoulder 68 from the shoulder 59 permits the resilient metallic conductors 55 and 56 to move the first and second switches 51 and 52 into the open position. The first and second switches 51 and 52 remain in the open position until the disconnect switch 50 is manually reset by the reset button 63. Concomitantly therewith, the return spring 64 moves the reset button 63 into an extended position. The reset button 63 extends from the housing 20 as shown in FIG. 1. The latch bar 66 and the latch shoulder 68 move in unison with the reset button 63.

The disconnect switch 50 is reset by depressing the reset button 63 against the urging of the return spring 64. The latch shoulder 68 of the latch bar 66 reengages with the shoulder 59 of the switch operator 57. The reset button 63 moves the first and second switches 51 and 52 into the closed position against the urging of the resilient metallic conductors 55 and 56.

Although the disconnect switch 50 has been shown as a normally open, latch closed solenoid mechanism, it should be appreciated by those skilled in the art that various types of mechanical and or electrical switches may be utilized within the present invention for providing the structure and function of the disconnect switch 50.

Figure 7:
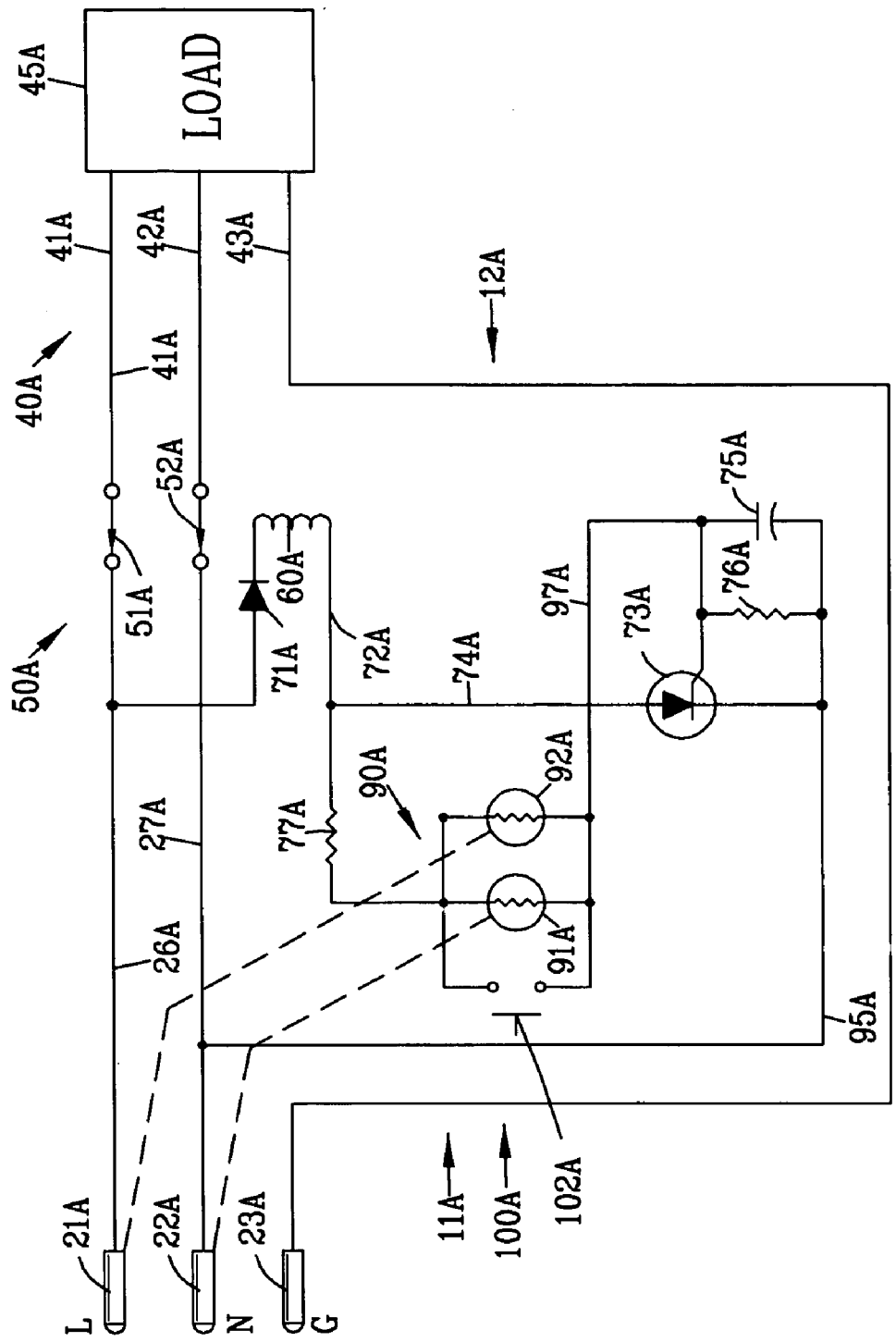
FIG. 7 is a first embodiment of an over heating detection and interrupter circuit incorporating the present invention.

FIG. 7 is a first embodiment of a circuit diagram of the over heating detection circuit 11A and an interrupter circuit 12A. A disconnect switch 50A includes switches 51A and 52A operating in unison. The first and second electrical blades 21A and 22A of the electrical plug 20 shown in FIG. 2 are connected by conductors 26A and 27A to a first side of the switches 51A and 52A. Conductors 41A and 42A of the wire assembly 40A interconnect a second side of switches 51A and 52A to a load 45A. The disconnect switch 50A is shown in the closed or reset condition. The ground lug 23A is connected directly to a ground conductor 43A of the wire assembly 40A bypassing the disconnect switch 50A.

A diode 71A is connected to the conductor 26A to provide power for the over heating detection circuit 11A and the interruption circuit 12A. The diode 71A provides power through the solenoid coil 60A of the disconnect switch 50A to a conductor 72A. The conductor 72A is connected to a switch shown as a thyristor 73A through a conductor 74A. A capacitor 75A and a resistor 76A are connected in parallel at the gate of the thyristor 73A.

A voltage divider network 90A comprises a resistor 77A, a first and a second heat sensitive device 91A and 92A and a resistor 76A. The first and second heat sensitive devices 91A and 92A are connected in parallel and are interposed between resistors 77A and 76A. The voltage divider network 90A is connected between the conductor 72A and a conductor 95A. The conductor 95A provides a return path to the conductor 27A for the over heating detection circuit 11A and the interruption circuit 12A. The first and second heat sensitive devices 91A and 92A are connected to the gate of the thyristor 73A through a conductor 97A.

In this example, the first and second heat sensitive devices 91A and 92A are shown as negative temperature coefficient first and second thermistors 91A and 92A. The operation of thermistors disclosed in U.S. Pat. No. 2,021,491 should be well known to those skilled in the art. Although the first and second heat sensitive devices 91A and 92A are shown as thermistors, it should be understood that various types of heat sensitive devices maybe used with the present invention.

The first and second heat sensitive devices 91A and 92A are located in thermal contact with the first and second electrical blades 21A and 22A as indicated by the dashed lines. Preferably, the first and second heat sensitive devices 91A and 92A are bonded to the first and second electrical blades 21A and 22A. Bonding agent such as thermally conductive adhesives, conductive epoxies, mechanical bonding or any suitable type of bonding may be used to bond first and second heat sensitive devices 91A and 92A to the first and second electrical blades 21A and 22A. An example of a first and a second heat sensitive device 91 and 92 bonded to the first and second electrical blades 21 and 22 is shown in FIGS. 3 and 5.

A test circuit 100A comprising a test switch 102A is connected across the first and second heat sensitive devices 91A and 92A. Preferably, the test switch 102A is a spring-loaded momentary contact switch 102A.

When the first and second electrical blades 21A and 22A are inserted into the power source receptacle 30 shown in FIG. 1, a conventional current flows from the conductor 26A through diode 71A and coil 60A to continue through the voltage divider network 90A including the first and second heat sensitive devices 91A and 92A to return path to the conductor 27A through conductor 95A. This conventional current flow from the conductor 26A through diode 71A and coil 60A and the voltage divider network 90A is insufficient to enable coil 60 to actuate the plunger 61 to open disconnect switch 50 as shown in FIG. 4.

Under normal operating temperature conditions, the resistance of the first and second heat sensitive devices 91A and 92A in combination with the resistors 95A and 93A produces a voltage on conductor 97A that is insufficient to trigger the thyristor 73A into a conductive state. In the event one of the first and second electrical blades 21A and 22A undergoes an undesirable overheated condition, then the resistance of the respective one of the first and second heat sensitive devices 91A and 92A is reduced thereby increasing the voltage on conductor 97A. The elevation of voltage at conductor 97A increases the current flow to the gate of the thyristor 73A to trigger the thyristor 73A into a conductive state. Conduction of thyristor 73A results in a current flow through coil 60A to actuate the plunger 61 to open disconnect switch 50 as shown in FIG. 6. The opening of the disconnect switch 50A terminates current flow through the first and second electrical blade 21A and 22A to the load 45A.

The test circuit 100A operates to simulate a reduced resistance of one of the first and second heat sensitive devices 91A and 92A. A momentary depression of the switch 102 increases the voltage on conductor 97A to increase the current flow to the gate of the thyristor 73A to trigger the thyristor 73A into a conductive state.

Figure 8:
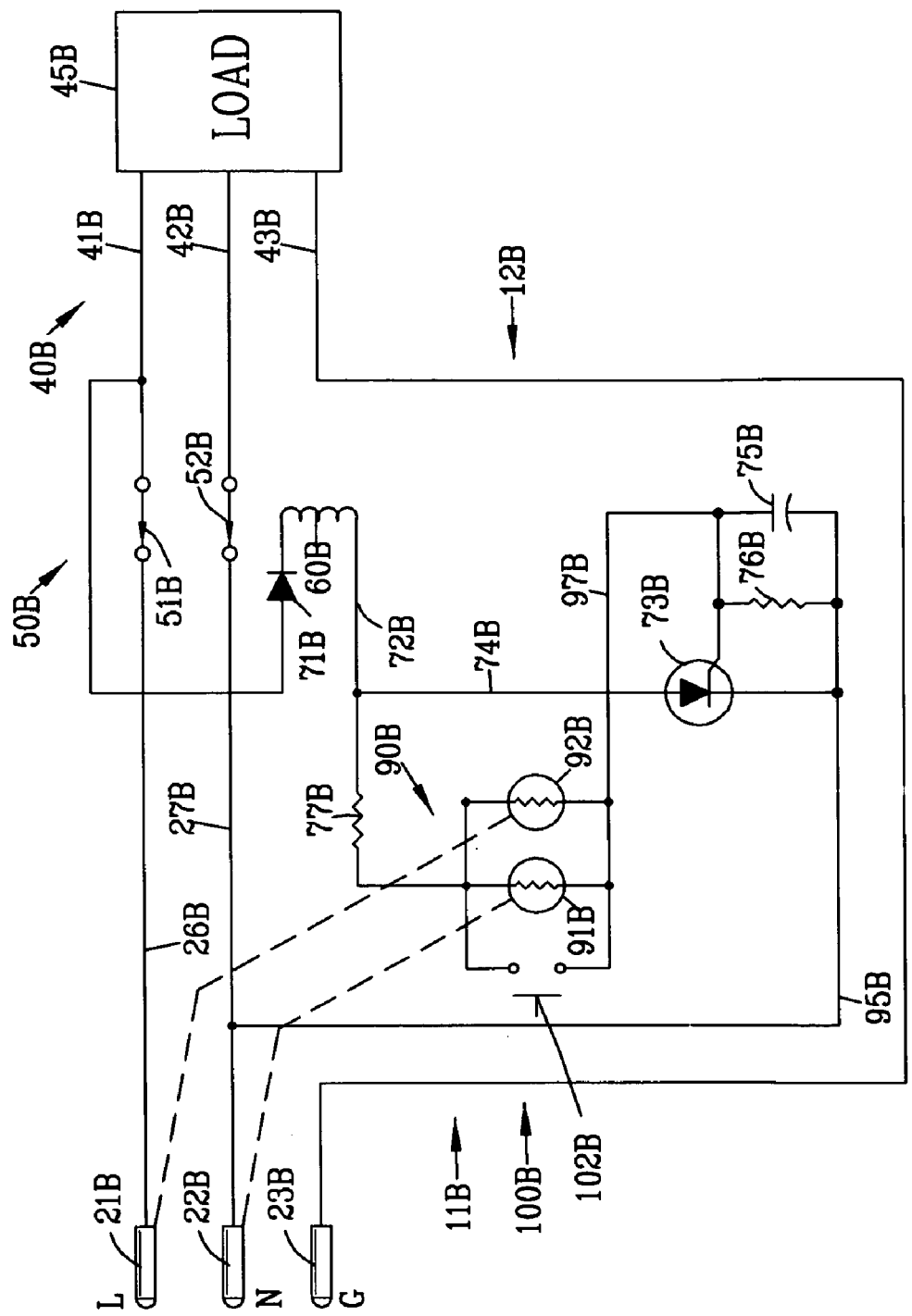
FIG. 8 is a second embodiment of an over heating detection and interrupter circuit incorporating the present invention.

FIG. 8 is a second embodiment of a circuit diagram of the over heating detection circuit 11B and the interrupter circuit 12B. Similar components are labeled with similar reference numerals with the sequential alphabetical character B. A disconnect switch 50B includes switches 51B and 52B operating in unison.

The first and second electrical blades 21B and 22B are connected by conductors 26B and 27B to a first side of the switches 5B and 52B. Conductors 41B and 42B of the wire assembly 40B interconnect a second side of switches 5B and 52B to a load 45B. The disconnect switch 50B is shown in the closed or reset condition. The ground lug 23B is connected directly to a ground conductor 43B of the wire assembly 40B bypassing the disconnect switch 50B.

In this second embodiment, the diode 71B is connected to conductor 41B to provide power for the over heating detection circuit 11B and the interruption circuit 12B.

Under normal operating temperature conditions, the resistance of the first and second heat sensitive devices 91B and 92B in combination with the resistors 76B and 77B produce a voltage on conductor 97B that is insufficient to trigger the thyristor 73B into a conductive state. In the event one of the first and second electrical blades 21B and 22B undergoes an undesirable overheated condition, than the resistance of the respective one of the first and second heat sensitive devices 91B and 92B is reduced thereby increasing the voltage on conductor 97B. The elevation of voltage at conductor 97B increases the current flow to the gate of the thyristor 73B to trigger the thyristor 73B into a conductive state. Conduction of thyristor 73B results in a current flow through coil 60B to open disconnect switch 50B as previously described with reference to FIG. 7. The opening of the disconnect switch 50B terminates current flow through the first and second electrical blade 21B and 22B to the load 45B. The test circuit 100B operates in a manner similar to test circuit 100A shown in FIG. 7.

The second embodiment of the over heating detection circuit 11B and the interrupter circuit 12B has the advantage of terminating all current flow upon the opening of the disconnect switch 50B. When the disconnect switch 50B is opened, the disconnect switch 50B terminates all voltage and current flow within the over heating detection circuit 11B and the interruption circuit 12B.

Figure 9:
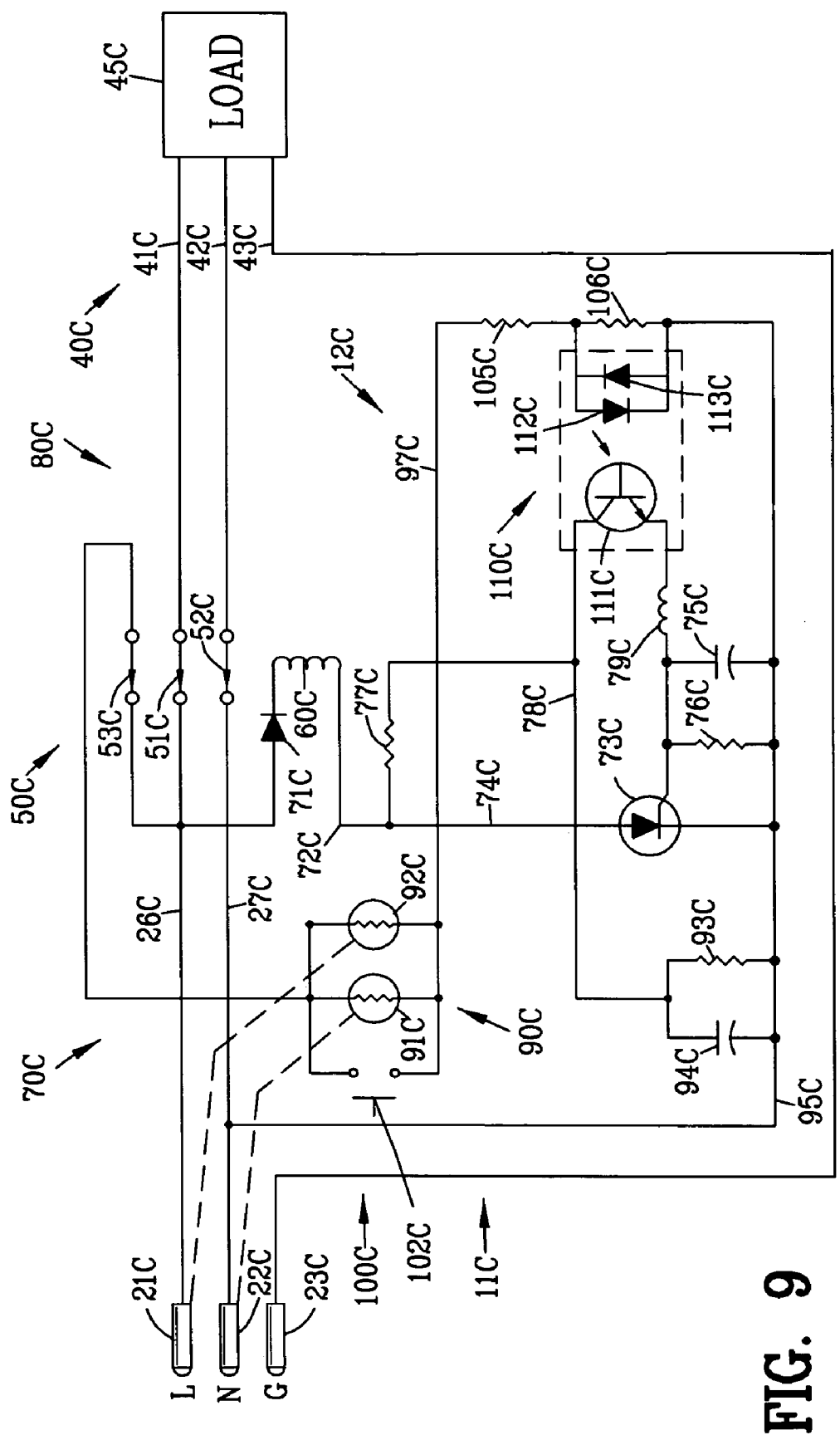
FIG. 9 is a third embodiment of an over heating detection and interrupter circuit incorporating the present invention.

FIG. 9 is a third embodiment of a circuit diagram of the over heating detection circuit 11C and the interrupter circuit 12C. Similar components are labeled with similar reference numerals with the sequential alphabetical character C. A primary circuit 70C is located on the left side of the disconnect switch 50C whereas a secondary circuit 80C is located on the right side of the disconnect switch 50C. The disconnect switch 50C comprises a first, a second and a third switch 51C-53C operating in unison.

A diode 71C is connected to the conductor 26C of the primary circuit 70C to provide power for the interruption circuit 12C. The diode 71C provides power through the solenoid coil 60C of the disconnect switch 50C to a conductor 72C. The conductor 72C is connected to a switch shown as a thyristor 73C through a conductor 74C. A capacitor 75C and a resistor 76C are connected in parallel at the gate of the thyristor 73C. A resistor 77C is connected through a conductor 78C to a resistor 93C. A capacitor 94C is located in parallel with the resistor 93C. A conductor 95C provides a return path to the conductor 27C for the over heating detection circuit 11C and the interruption circuit 12C.

The third switch 53C connects the conductor 26C of the primary circuit 70C to provide power for the over heating detection circuit 11C. The third switch 53C is connected to a voltage divider network 90C. The voltage divider network 90C comprises a first and a second heat sensitive device 91C and 92C and resistors 105C and 106C. The parallel first and second heat sensitive devices 91C and 92C are connected by conductor 97C to the series resistors 105C and 106C.

The resistor 106C is connected to an optocoupler 10C. The optocoupler 10C comprising light emitting devices 112C and 113C optically coupled to a photosensitive switch 111C. Although, the optocoupler 110C has been shown with a phototransistor as a photosensitive switch 111C and light emitting diodes a light emitting devices 112C and 113C, it should be appreciated by those skilled in the art that various other photosensitive switches 111C and light emitting devices 112C and 113C may be used with the present invention.

The resistor 106C is connected across the light emitting devices 112C and 113C for actuating the optocoupler 110C. A collector of the photosensitive switch 111C is connected to the conductor 78C whereas an emitter of the photosensitive switch 111C is connected through a coil 79C to the gate of the thyristor 73C. The first and second heat sensitive devices 91C and 92C are located in thermal contact with the first and second electrical blades 21C and 22C as indicated by the dashed lines as heretofore described.

When the first and second electrical blades 21C and 22C are inserted into the power source receptacle 30 shown in FIG. 1, a conventional current flows from the conductor 26C through diode 71C and coil 60C to continue through the resistors 77C and 93C to provide operating voltage to the collector of the photosensitive switch 111C on conductor 78C. This conventional current flow from the conductor 26C through diode 71C and coil 60C and the resistors 77C and 93C is insufficient to enable coil 60C to open disconnect switch 50C as previously described with reference to FIG. 7.

A conventional current flows from the conductor 26C through the voltage divider network 90C including the first and second heat sensitive devices 91C and 92C and resistors 105C and 106C. Under normal operating temperature conditions, the resistance of the first and second heat sensitive devices 91C and 92C in combination with the resistors 105C and 106C produces a voltage across resistor 106C that is insufficient to illuminate light emitting devices 112C and 113C.

In the event one of the first and second electrical blades 21C and 22C undergoes an undesirable overheated condition, than the resistance of the respective one of the first and second heat sensitive devices 91C and 92C is reduced thereby increasing the voltage across resistor 106C. The elevation of voltage across resistor 106C illuminates light emitting devices 112C and 113C to actuate the photosensitive switch 111C into a conductive state. Conduction of the photosensitive switch 111C causes conduction of thyristor 73C. The conduction of thyristor 73C results in a current flow through coil 60C to open disconnect switch 50C as previously described with reference to FIG. 7. The opening of the disconnect switch 50C terminates current flow through the first and second electrical blade 21C and 22C to the load 45C.

A test circuit 100C comprising a test switch 102C is connected across the first and second heat sensitive devices 91C and 92C. The test circuit 100C operates to simulate a reduced resistance of one of the first and second heat sensitive devices 91C and 92C. A momentary depression of the switch 102C increases the voltage on conductor 97C to increase the current flow to the gate of the thyristor 73C to trigger the thyristor 73C into a conductive state.

The third embodiment of the over heating detection circuit 11C and the interrupter circuit 12C has the advantage of isolating the over heating detection circuit 11C from the interrupter circuit 12C through the use of the optocoupler 110C.

Figure 10:
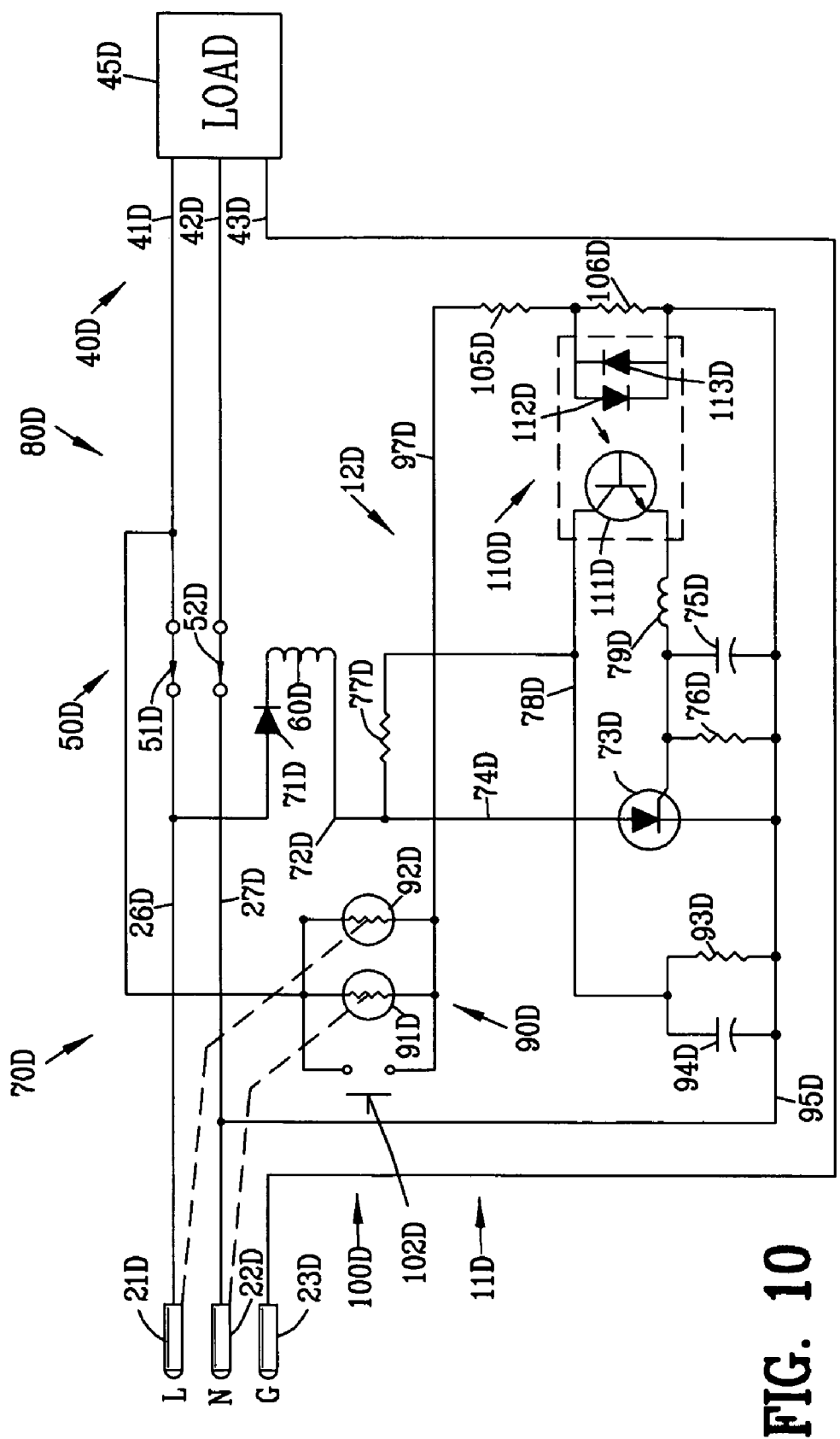
FIG. 10 is a forth embodiment of an over heating detection and interrupter circuit incorporating the present invention.

FIG. 10 is a fourth embodiment of a circuit diagram of the over heating detection circuit 11D and the interrupter circuit 12D. Similar components are labeled with similar reference numerals with the sequential alphabetical character D. A primary circuit 70D is located on the left side of the disconnect switch 50D whereas a secondary circuit 80D is located on the right side of the disconnect switch 50D. The disconnect switch 50D comprises a first and a second switch 51D and 52D operating in unison.

A diode 71D is connected to the conductor 26D of the primary circuit 70D to provide power for the interruption circuit 12D. The diode 71D provides power through the solenoid coil 60D of the disconnect switch 50D to a conductor 72D. The conductor 72D is connected to a switch shown as a thyristor 73D through a conductor 74D. A capacitor 75D and a resistor 76D are connected in parallel at the gate of the thyristor 73D. A resistor 77D is connected through a conductor 78D to a resistor 93D. A capacitor 94D is located in parallel with the resistor 93D. A conductor 95D provides a return path to the conductor 27D for the over heating detection circuit 11D and the interruption circuit 12D.

The conductor 41D in the secondary circuit 80D provides power for the over heating detection circuit 11D. The conductor 41D in the secondary circuit 80D is connected to a voltage divider network 90D. The voltage divider network 90D comprises a first and a second heat sensitive device 91D and 92D and resistors 105D and 106D. The parallel first and second heat sensitive devices 91D and 92D are connected by conductor 97D to the series resistors 105D and 106D.

The resistor 106D is connected to an optocoupler 110D. The optocoupler 110D comprising light emitting devices 112D and 113D optically coupled to a photosensitive switch 111D. The resistor 106D is connected across the light emitting devices 112D and 113D for actuating the optocoupler 110D. A collector of the photosensitive switch 111D is connected to the conductor 78D whereas an emitter of the photosensitive switch 111D is connected through a coil 79D to the gate of the thyristor 73D. The first and second heat sensitive devices 91D and 92D are located in thermal contact with the first and second electrical blades 21D and 22D as indicated by the dashed lines as heretofore described.

When the first and second electrical blades 21D and 22D are inserted into the power source receptacle 30 shown in FIG. 1, a conventional current flows from the conductor 26D through diode 71D and coil 60D to continue through the resistors 77D and 93D to provide operating voltage to the collector of the photosensitive switch 111D on conductor 78D. This conventional current flow from the conductor 26D through diode 71D and coil 60D and the resistors 77D and 93D is insufficient to enable coil 60D to open disconnect switch 50D as previously described with reference to FIG. 7.

A conventional current flows from the conductor 41D through the voltage divider network 90D including the first and second heat sensitive devices 91D and 92D and resistors 105D and 106D. Under normal operating temperature conditions, the resistance of the first and second heat sensitive devices 91D and 92D in combination with the resistors 105D and 106D produces a voltage across resistor 106D that is insufficient to illuminate light emitting devices 112D and 113D.

In the event one of the first and second electrical blades 21D and 22D undergoes an undesirable overheated condition, than the resistance of the respective one of the first and second heat sensitive devices 91D and 92D is reduced thereby increasing the voltage across resistor 106D. The elevation of voltage across resistor 106D illuminates light emitting devices 112D and 113D to actuate the photosensitive switch 111D into a conductive state. Conduction of the photosensitive switch 111D causes conduction of thyristor 73D. The conduction of thyristor 73D results in a current flow through coil 60D to open disconnect switch 50D as previously described with reference to FIG. 7. The opening of the disconnect switch 50D terminates current flow through the first and second electrical blade 21D and 22D to the load 45D.

A test circuit 100D comprising a test switch 102D is connected across the first and second heat sensitive devices 91D and 92D. The test circuit 100D operates to simulate a reduced resistance of one of the first and second heat sensitive devices 91D and 92D. A momentary depression of the switch 102D increases the voltage on conductor 97D to increase the current flow to the gate of the thyristor 73D to trigger the thyristor 73D into a conductive state.

The fourth embodiment of the over heating detection circuit 11D and the interrupter circuit 12D has the advantage of isolating the over heating detection circuit 11D from the interrupter circuit 12D through the use of the optocoupler 110D. In addition, the fourth embodiment has the advantage of terminating all current to the over heating detection circuit 11D upon the opening of the disconnect switch 50D.

Figure 11:
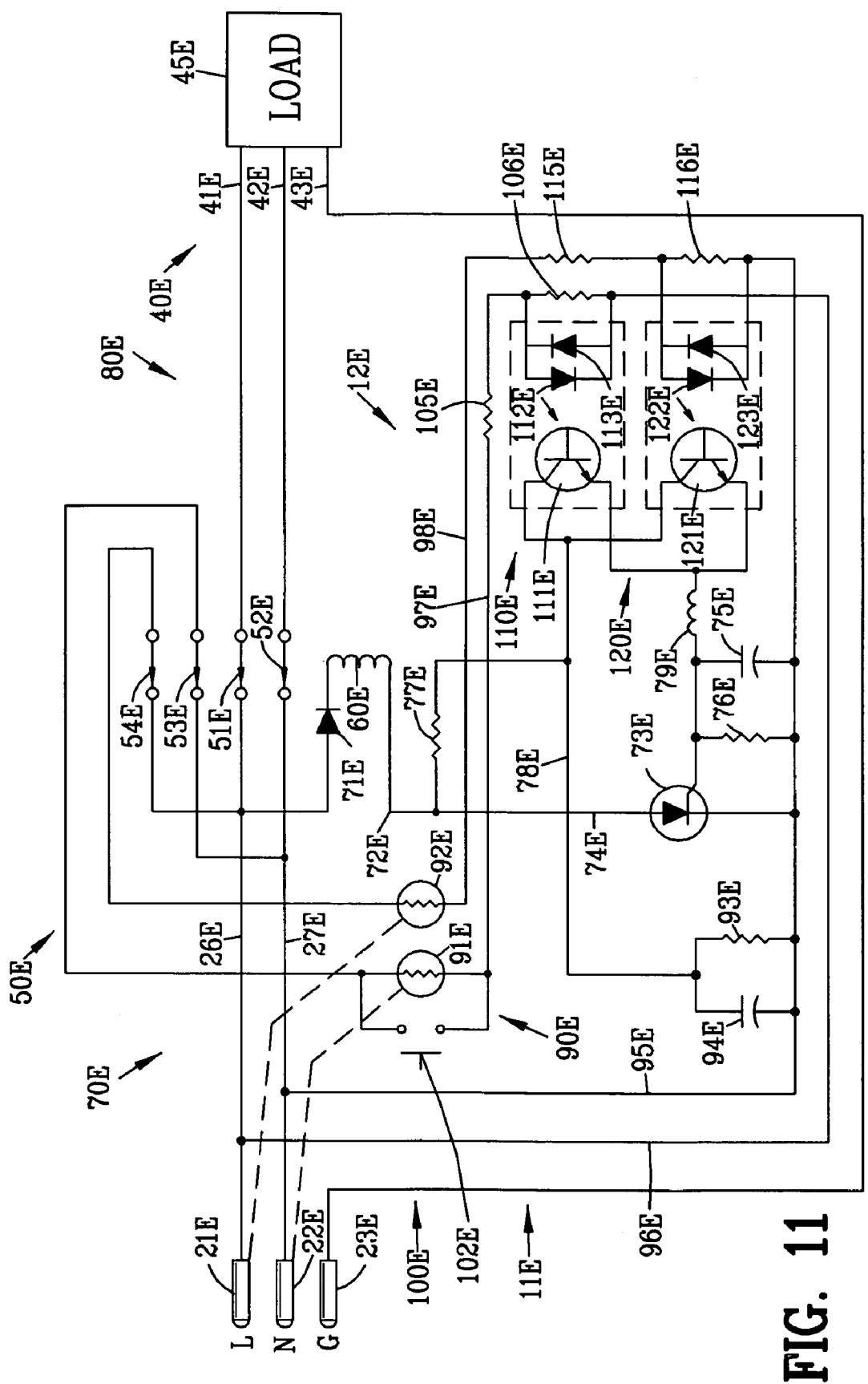
FIG. 11 is a fifth embodiment of an over heating detection and interrupter circuit incorporating the present invention.

FIG. 11 is a fifth embodiment of a circuit diagram of the over heating detection circuit 11E and the interrupter circuit 12E. Similar components are labeled with similar reference numerals with the sequential alphabetical character E. A primary circuit 70E is located on the left side of the disconnect switch 50E whereas a secondary circuit 80E is located on the right side of the disconnect switch 50E. The disconnect switch 50E comprises a first through fourth switch 51E-54E operating in unison.

A diode 71E is connected to the conductor 26E of the primary circuit 70E to provide power for the interruption circuit 12E. The diode 71E provides power through the solenoid coil 60E of the disconnect switch 50E to a conductor 72E. The conductor 72E is connected to a switch shown as a thyristor 73E through a conductor 74E. A capacitor 75E and a resistor 76E are connected in parallel at the gate of the thyristor 73E.

The conductor 72E is connected through a resistor 77E and a conductor 78E to a resistor 93E. A capacitor 94E is located in parallel with the resistor 93E. A conductor 95E provides a return path to the conductor 27E for the interruption circuit 12E.

The third switch 53E is connected to the conductor 27E in the primary circuit 70E to provide power for a portion of the over heating detection circuit 11E. The fourth switch 54E is connected to the conductor 26E in the primary circuit 70E to provide power for the reminder of the over heating detection circuit 11E. The third switch 54E and the fourth switch operate simultaneously with first and second switches 51E and 52E.

The third switch 53E is connected to a voltage divider network comprising a first sensitive device 91E connected by a conductor 97E in series with resistors 105E and 106E. The fourth switch 54E is connected to a voltage divider network comprising a second heat sensitive device 92E connected by a conductor 98E in series with resistors 115E and 116E. The first and second heat sensitive devices 91E and 92E are located in thermal contact with the first and second electrical blades 21E and 22E as indicated by the dashed lines as heretofore described.

The resistor 106E is connected to an optocoupler 110E. The optocoupler 110E comprises light emitting devices 112E and 113E optically coupled to a photosensitive switch 111E. The resistor 106E is connected across the light emitting devices 112E and 113E for actuating the optocoupler 110E. The resistor 116E is connected to an optocoupler 120E. The optocoupler 120E comprises light emitting devices 122E and 123E optically coupled to a photosensitive switch 121E. The resistor 116E is connected across the light emitting devices 122E and 123E for actuating the optocoupler 120E. The collectors of the photosensitive switches 111E and 121E are connected to the conductor 78E whereas an emitters of the photosensitive switches 111E and 121E are connected through a coil 79E to the gate of the thyristor 73E.

When the first and second electrical blades 21E and 22E are inserted into the power source receptacle 30 shown in FIG. 1, a conventional current flows from the conductor 26E through diode 71E and coil 60E to continue through the resistors 77E and 93E to provide operating voltage to the collectors of the photosensitive switches 111E and 121E on conductor 78E. This conventional current flow from the conductor 26E through diode 71E and coil 60E and the resistors 77E and 93E is insufficient to enable coil 60E to open disconnect switch 50E.

A conventional current flows from the conductor 27E through the switch 53E to the voltage divider network comprising first sensitive device 91E connected by a conductor 97E in series with resistors 105E and 106E. Under normal operating temperature conditions, the resistance of the first heat sensitive device 91E in combination with the resistors 105E and 106E produces a voltage across resistor 106E that is insufficient to illuminate light emitting devices 112E and 113E.

A conventional current flows from the conductor 26E through the switch 54E to the voltage divider network comprising second sensitive device 92E connected by a conductor 98E in series with resistors 115E and 116E. Under normal operating temperature conditions, the resistance of the second heat sensitive device 92E in combination with the resistors 115E and 116E produces a voltage across resistor 116E that is insufficient to illuminate light emitting devices 122E and 123E.

In the event the first electrical blade 21E undergoes an undesirable overheated condition, than the resistance of the first heat sensitive device 91E is reduced thereby increasing the voltage across resistor 106E. The elevation of voltage across resistor 106E illuminates light emitting devices 112E and 113E to actuate the photosensitive switch 111E into a conductive state.

In the event the second electrical blade 22E undergoes an undesirable overheated condition, than the resistance of the second heat sensitive device 92E is reduced thereby increasing the voltage across resistor 116E. The elevation of voltage across resistor 116E illuminates light emitting devices 122E and 123E to actuate the photosensitive switch 121E into a conductive state.

Conduction of either the photosensitive switch 111E or photosensitive switch 121E causes conduction of thyristor 73E. The conduction of thyristor 73E results in a current flow through coil 60E to open disconnect switch 50E. The opening of the disconnect switch 50E terminates current flow through the first and second electrical blade 21E and 22E to the load 45E.

A test circuit 100E comprising a test switch 102E is connected across the first and second heat sensitive devices 91E and 92E. The test circuit 100E operates to simulate a reduced resistance of one of the first and second heat sensitive devices 91E and 92E. A momentary depression of the switch 102E increases the voltage on conductor 97E to increase the current flow to the gate of the thyristor 73E to trigger the thyristor 73E into a conductive state.

The fifth embodiment of the over heating detection circuit 11E and the interrupter circuit 12E has the advantage of isolating the over heating detection circuit 11E from the interrupter circuit 12E through the use of the optocouplers 110E and 120E. In addition, the fifth embodiment has the advantage of individually sensing the temperature of the first and second electrical blades 21E and 22E.

Figure 12:
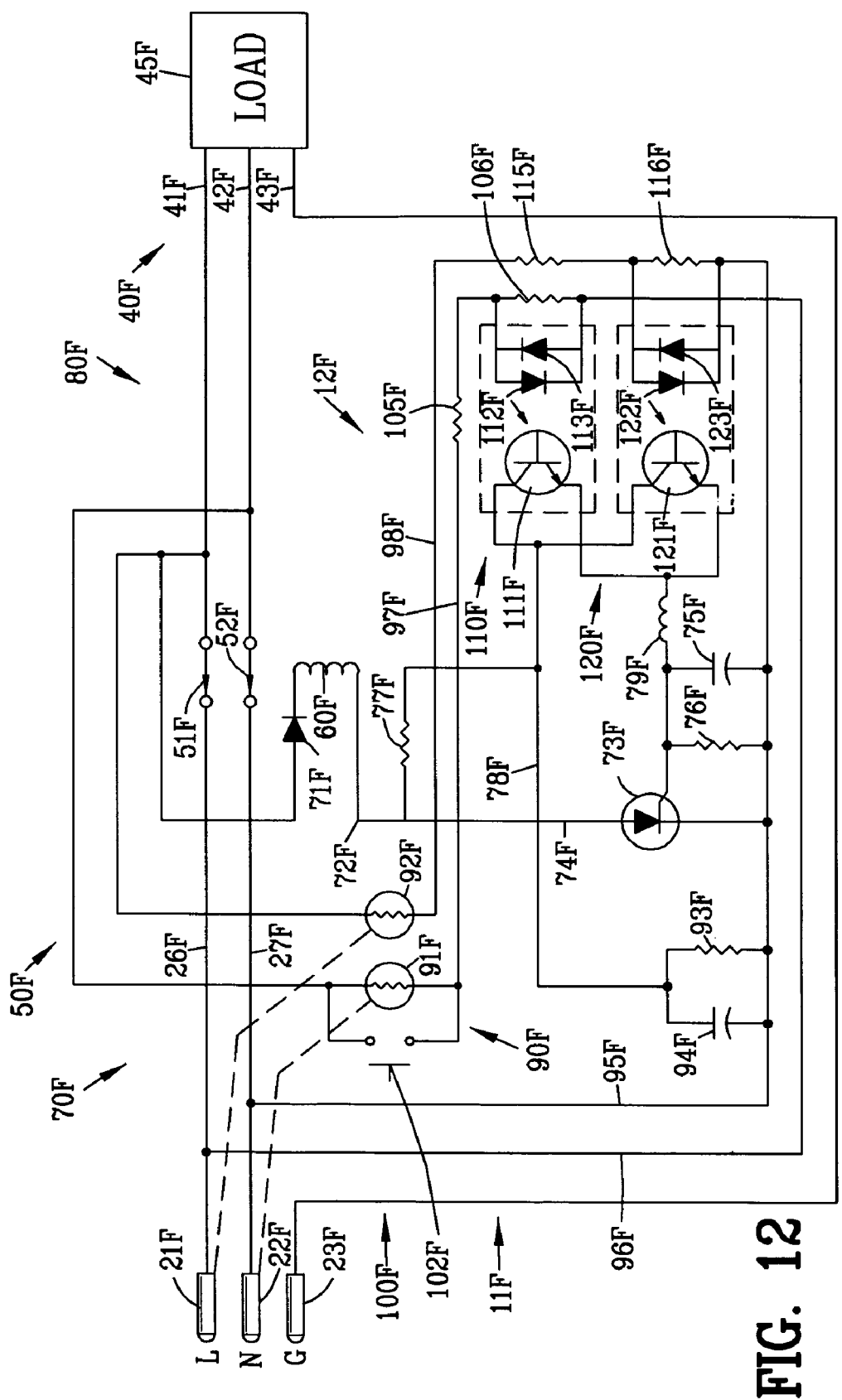
FIG. 12 is a sixth embodiment of an over heating detection and interrupter circuit incorporating the present invention.

FIG. 12 is a sixth embodiment of a circuit diagram of the over heating detection circuit 11F and the interrupter circuit 12F. Similar components are labeled with similar reference numerals with the sequential alphabetical character F. A primary circuit 70F is located on the left side of the disconnect switch 50F whereas a secondary circuit 80F is located on the right side of the disconnect switch 50F. The disconnect switch 50F comprises a first and a second switch 51F and 52F operating in unison.

A diode 71F is connected to the conductor 41F of the secondary circuit 80F to provide power for the interruption circuit 12F. The diode 71F provides power through the solenoid coil 60F of the disconnect switch 50F to a conductor 72F. The conductor 72F is connected to a switch shown as a thyristor 73F through a conductor 74F. A capacitor 75F and a resistor 76F are connected in parallel at the gate of the thyristor 73F.

The conductor 72F is connected through a resistor 77F and a conductor 78F to a resistor 93F. A capacitor 94F is located in parallel with the resistor 93F. A conductor 95F provides a return path to the conductor 27F for the interruption circuit 12F.

The conductors 41F and 42F in the secondary circuit 80F provide power for the over heating detection circuit 11F. The over heating detection circuit 11F comprises first and second heat sensitive devices 91F and 92F in thermal contact with the first and second electrical blades 21F and 22F as indicated by the dashed lines. The conductor 42F in the secondary circuit 80F is connected to a voltage divider network comprising a first heat sensitive device 91F connected by a conductor 97F in series with resistors 105F and 106F. Similarly, the conductor 41F in the secondary circuit 80F is connected to a voltage divider network comprising a second heat sensitive device 92F connected by a conductor 98F in series with resistors 115F and 116F. The first and second heat sensitive devices 91F and 92F are located in thermal contact with the first and second electrical blades 21F and 22F as indicated by the dashed lines as heretofore described.

The resistor 106F is connected to an optocoupler 110F. The optocoupler 110F comprises light emitting devices 112F and 113F optically coupled to a photosensitive switch 111F. The resistor 106F is connected across the light emitting devices 112F and 113F for actuating the optocoupler 110F. The resistor 116F is connected to an optocoupler 120F. The optocoupler 120F comprises light emitting devices 122F and 123F optically coupled to a photosensitive switch 121F. The resistor 116F is connected across the light emitting devices 122F and 123F for actuating the optocoupler 120F. The collectors of the photosensitive switches 111F and 121F are connected to the conductor 78F whereas emitters of the photosensitive switches 111F and 121F are connected through a coil 79F to the gate of the thyristor 73F.

When the first and second electrical blades 21F and 22F are inserted into the power source receptacle 30 shown in FIG. 1, a conventional current flows from the conductor 26F through diode 71F and coil 60F to continue through the resistors 77F and 93F to provide operating voltage to the collectors of the photosensitive switches 111F and 121F on conductor 78F. This conventional current flow from the conductor 26F through diode 71F and coil 60F and the resistors 77F and 93F is insufficient to enable coil 60F to open disconnect switch 50F.

A conventional current flows from the conductor 27F through the switch 52F to the voltage divider network comprising first thermal sensitive device 91F connected by a conductor 97F in series with resistors 105F and 106F. Similarly, conventional current flows from the conductor 41F through the voltage divider network comprising second sensitive device 92F connected by a conductor 98F in series with resistors 115F and 116F Under normal operating temperature conditions, the resistance of the first heat sensitive device 91F in combination with the resistors 105F and 106F produces a voltage across resistor 106F that is insufficient to illuminate light emitting devices 112F and 113F.

A conventional current flows from the conductor 26F through the switch 51F to the voltage divider network comprising second sensitive device 92F connected by a conductor 98F in series with resistors 115F and 116F. Under normal operating temperature conditions, the resistance of the second heat sensitive device 92F in combination with the resistors 115F and 116F produces a voltage across resistor 116F that is insufficient to illuminate light emitting devices 122F and 123F.

In the event the first electrical blade 21F undergoes an undesirable overheated condition, than the resistance of the first heat sensitive device 91F is reduced thereby increasing the voltage across resistor 106F. The elevation of voltage across resistor 106F illuminates light emitting devices 112F and 113F to actuate the photosensitive switch 111F into a conductive state.

In the event the second electrical blade 22F undergoes an undesirable overheated condition, than the resistance of the second heat sensitive device 92F is reduced thereby increasing the voltage across resistor 116F. The elevation of voltage across resistor 116F illuminates light emitting devices 122F and 123F to actuate the photosensitive switch 121F into a conductive state.

Conduction of either the photosensitive switch 111F or photosensitive switch 121F causes conduction of thyristor 73F. The conduction of thyristor 73F results in a current flow through coil 60F to open disconnect switch 50F. The opening of the disconnect switch 50F terminates current flow through the first and second electrical blade 21F and 22F to the load 45F.

A test circuit 100F comprising a test switch 102F is connected across the first and second heat sensitive devices 91F and 92F. The test circuit 100F operates to simulate a reduced resistance of one of the first and second heat sensitive devices 91F and 92F. A momentary depression of the switch 102F increases the voltage on conductor 97F to increase the current flow to the gate of the thyristor 73F to trigger the thyristor 73F into a conductive state.

Figure 13:
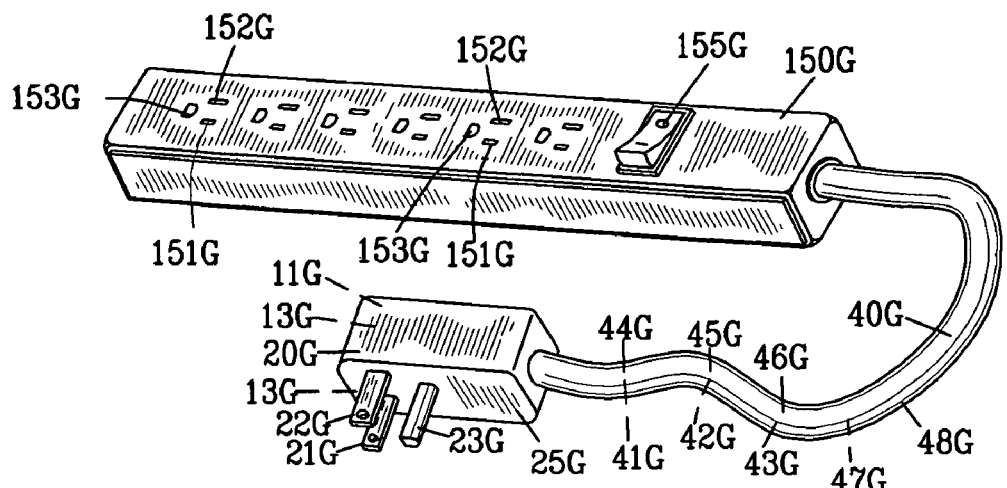
FIG. 13 is a seventh embodiment of an over heating detection and interrupter circuit of the present invention incorporated into an electrical power strip.

FIG. 13 is an isometric view of the over heating detection circuit 11G and the interrupter circuit 12G incorporated into an electrical plug 20G for connection to an electrical power strip 150G. The interrupter circuit 12G is connected to the electrical power strip 150G by a power cable 40G for providing electrical power to a plurality of electrical receptacles. Each of the plurality of electrical receptacles includes a first and a second electrical slot 151G and 152G and a ground aperture 153G. An optional power switch 155G may be incorporated within the electrical power strip 150G for controlling electrical power to the plurality of electrical receptacles.

In this example, the interrupter circuit 12G is incorporated into a leakage current detection and interruption circuit 13G located within the interrupter circuit 12G. As will be described in greater detail hereinafter, the leakage current detection and interruption circuit 13G interrupts electrical power to a load upon the detection of a leakage current within the power cable 40G.

Figure 13A:
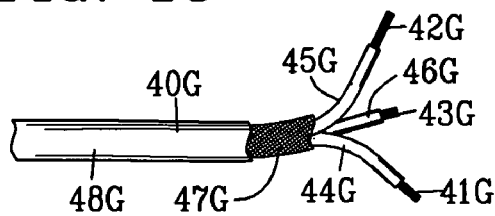
FIG. 13A is a potion of FIG. 13 illustrating an internal configuration of a power cable.

FIG. 13A is a potion of the power cable 40G of FIG. 13 illustrating the internal configuration of the power cable 40G. The power cable 40G includes a first conductor and second conductor 41G and 42G shown as a line wire and a neutral wire. In this example, the power cable 40G includes an optional ground conductor 43. Insulation layers 44G and 45G cover the first conductor and second conductor 41G and 42G whereas an insulation layer 46G covers the optional ground conductor 43G.

A conductive shield 47G surrounds the first and second conductors 41G and 42G and the optional ground conductor 43G. The conductive shield 47G provides a sensing lead for sensing a leakage current from one of the first and second conductors 41G and 42G. An insulating layer 48G overlays the conductive shield 47G.

Figure 14:
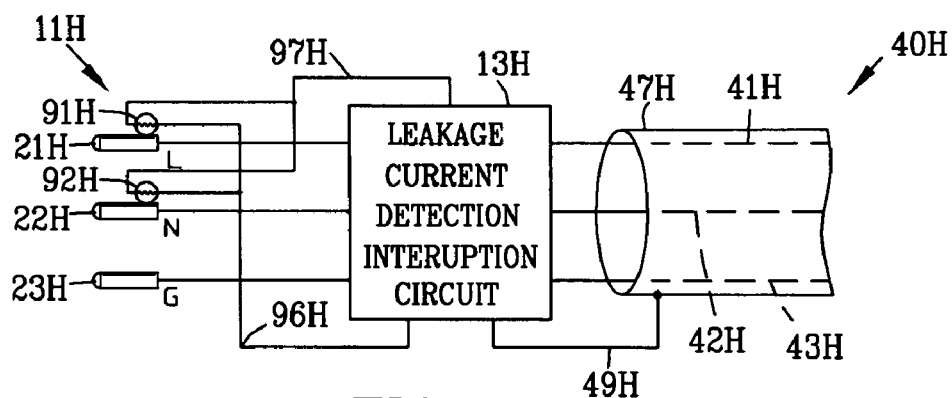
FIG. 14 is a block diagram of the electrical power strip of FIG. 13 with the over heating detection and interrupter circuit cooperating with a leakage current detection circuit for disconnecting electrical power upon detecting an over heated condition.

FIG. 14 is a block diagram of a first example of an over heating detection circuit 11H cooperating with the leakage current detection circuit 13H for disconnecting electrical power upon detecting an over heated condition. The over heating detection circuit 11H and the leakage current detection circuit 13H is suitable for use in the electrical power strip 150G of FIG. 13.

The over heating detection circuit 11H comprises first and second heat sensitive devices 91H and 92H secured to the first and second blades 21H and 22H. Conductors 96H and 97H connect the first and second heat sensitive devices 91H and 92H to the leakage current detection circuit 13H. The leakage current detection circuit 13H disconnects electrical power upon the over heating detection circuit 11H detecting an over heated condition.

The power cable 40H is connected to the leakage current detection circuit 13H. A conductor 49H connects the conductive shield 47H of the power cable 40H to the leakage current detection circuit 13H. The leakage current detection circuit 13H disconnects electrical power upon the detection of a leakage current within the power cable 40H.

Figure 15:
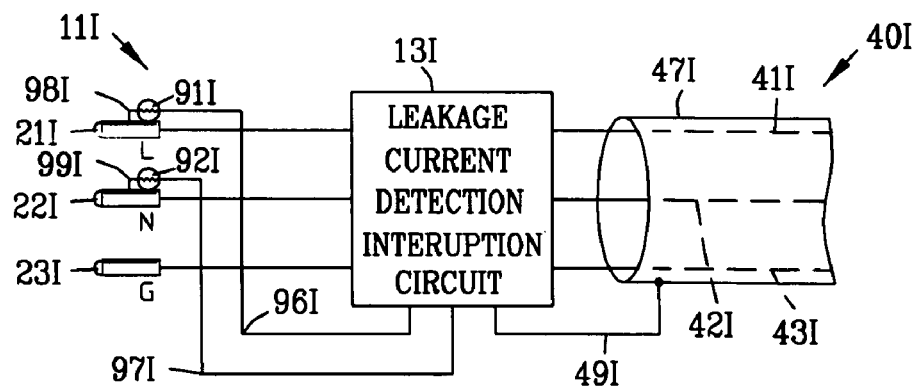
FIG. 15 is a block diagram of the electrical power strip of FIG. 13 with an alternate example of the over heating detection and interrupter circuit cooperating with a leakage current detection circuit for disconnecting electrical power upon detecting an over heated condition.

FIG. 15 is a block diagram of a second example of an over heating detection circuit 11I cooperating with the leakage current detection circuit 13I for disconnecting electrical power upon detecting an over heated condition. The over heating detection circuit 11I and the leakage current detection circuit 13I is suitable for use in the electrical power strip 150G of FIG. 13.

The over heating detection circuit 11I comprises a first and a second s device 91I and 92I secured to the first and second blades 21I and 22I. One terminal of the first heat sensitive device 91I is electrically connected to the first blade 21I whereas one terminal of the second heat sensitive device 92I is electrically connected to the second blade 22I. Conductors 96I and 97I individually connect the first and second heat sensitive devices 91I and 92I to the leakage current detection circuit 13I. The leakage current detection circuit 13I disconnects electrical power upon the over heating detection circuit 11I detecting an over heated condition.

The power cable 40I is connected to the leakage current detection circuit 13I. A conductor 49I connects the conductive shield 47I of the power cable 40I to the leakage current detection circuit 13I. The leakage current detection circuit 13I disconnects electrical power upon the detection of a leakage current within the power cable 40I.

Figure 16:
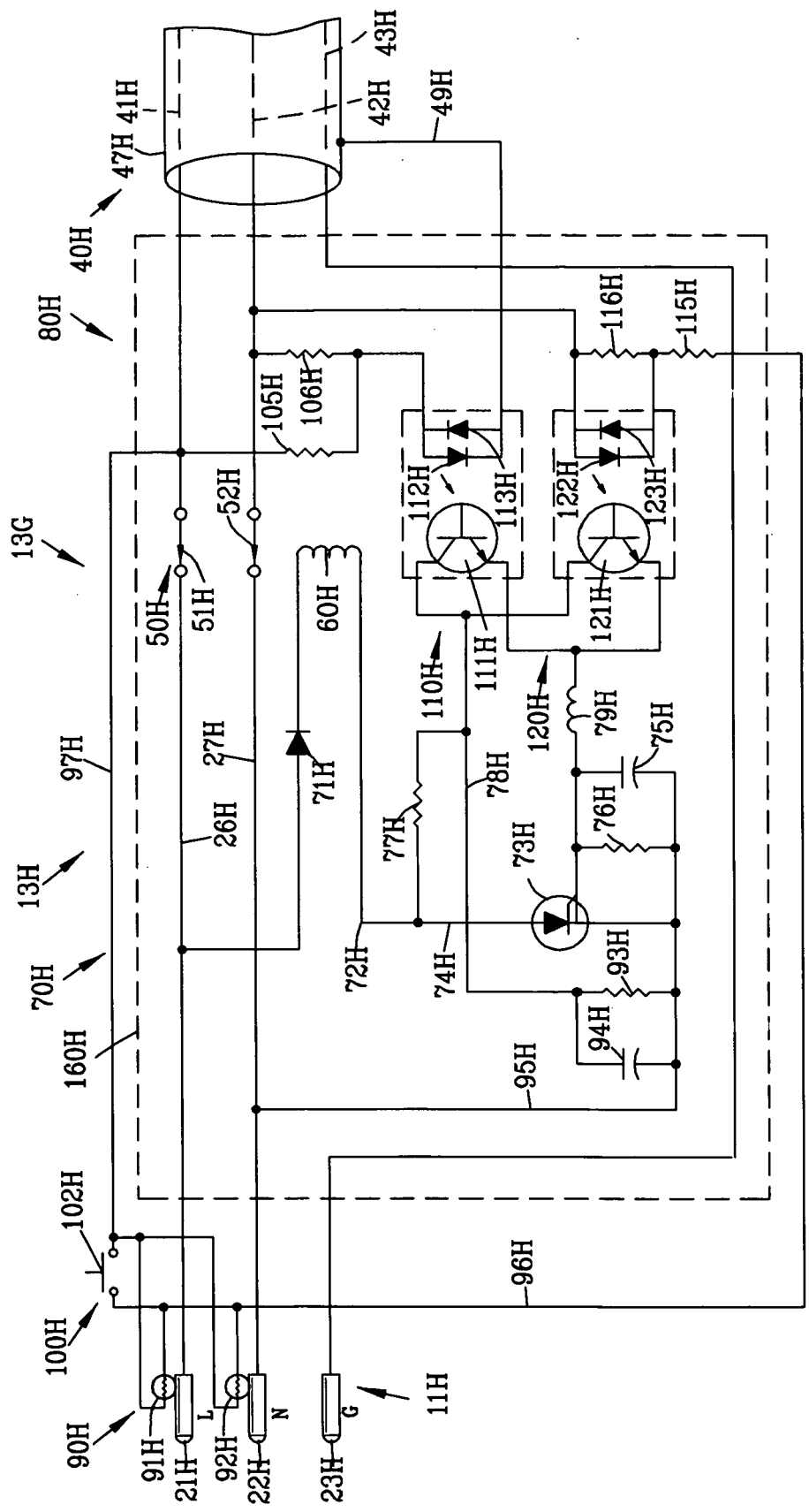
FIG. 16 is a detailed circuit diagram of the block diagram of FIG. 14.

FIG. 16 is a detailed circuit diagram of the block diagram of FIG. 14 illustrating the over heating detection circuit 11H and the leakage current detection circuit 13H. The leakage current detection circuit 13H functions to interrupt the electrical power upon the over heating detection circuit 11H detecting an over heated condition. Similar components are labeled with similar reference numerals with the sequential alphabetical character H. A primary circuit 70H is located on the left side of the disconnect switch 50H whereas a secondary circuit 80H is located on the right side of the disconnect switch 50H. The disconnect switch 50H comprises a first and a second switch 51H and 52H operating in unison.

The leakage current detection circuit 13H is shown enclosed by the dashed lines in FIG. 15. A diode 71H is connected to the conductor 26H of the primary circuit 70H to provide power for the leakage current detection circuit 13H. The diode 71H provides power through the solenoid coil 60H of disconnect switch 50H to a conductor 72H. The conductor 72H is connected to a switch shown as a thyristor 73H through a conductor 74H. A capacitor 75H and a resistor 76H are connected in parallel at the gate of the thyristor 73H.

The conductor 72H is connected through a resistor 77H and a conductor 78H to a resistor 93H. A capacitor 94H is located in parallel with the resistor 93H. A conductor 95H provides a return path to the conductor 27H for the interruption circuit 12H.

The leakage current detection circuit 13H comprises optocoupler 110H. The optocoupler 110H comprises light emitting devices 112H and 113H optically coupled to a photosensitive switch 111H. A divider circuit comprising resistors 105H and 106H is connected between the conductors 41H and 42H. The junction of resistors 105H and 106H is connected through the light emitting devices 112H and 113H and conductor 49H to the shield 47H of the power cable 40H. The resistor 106H is connected in series with the light emitting devices 112H and 113H for actuating the optocoupler 110H.

The collector of the photosensitive switch 111H is connected to the conductor 78H whereas the emitter of the photosensitive switch 111H is connected through a coil 79H to the gate of the thyristor 73H.

The over heating detection circuit 11H comprises a first and a second heat sensitive device 91H and 92H connected by a conductor 96H and 97H in series with resistors 115H and 116H. The first and second heat sensitive devices 91H and 92H are located in thermal contact with the first and second electrical blades 21H and 22H.

The resistor 116H is connected to an optocoupler 120H. The optocoupler 120H comprises light emitting devices 122H and 123H optically coupled to a photosensitive switch 121H. The resistor 116H is connected across the light emitting devices 122H and 123H for actuating the optocoupler 120H. The collector of the photosensitive switch 121H is connected to the conductor 78H whereas the emitter of the photosensitive switch 121H is connected through a coil 79H to the gate of the thyristor 73H.

When the first and second electrical blades 21H and 22H are inserted into the power source receptacle 30 shown in FIG. 1, a conventional current flows from the conductor 26H through diode 71H and coil 60H to continue through the resistors 77H and 93H to provide operating voltage to the collectors of the photosensitive switches 111H and 121H on conductor 78H. The conventional current flow from the conductor 26H through diode 71H and coil 60H and the resistors 77H and 93H is insufficient to enable coil 60H to open disconnect switch 50H.

A conventional current flows through the first and second heat sensitive devices 91H and 92H and series resistors 115H and 116H through conductors 96H and 97H. Under normal operating temperature conditions, the resistance of the first and second heat sensitive devices 91H and 92H and series resistors 115H and 116H produce a voltage across resistor 116H that is insufficient to illuminate light emitting devices 122H and 123H.

In the event one of the first and second electrical blade 21H and 22H undergoes an undesirable overheated condition, than the resistance of the respective first and second heat sensitive devices 91H and 92H is reduced thereby increasing the voltage across resistor 116H. The elevation of voltage across resistor 116H illuminates light emitting devices 122H and 123H to actuate the photosensitive switch 121H into a conductive state.

Conduction of photosensitive switch 121H causes conduction of thyristor 73H to open disconnect switch 50H. The opening of the disconnect switch 50H terminates current flow through the first and second electrical blade 21H and 22H to the load 45H.

A test circuit 100H comprising a test switch 102H is connected across the first and second heat sensitive devices 91H and 92H operates to simulate a reduced resistance of one of the first and second heat sensitive devices 91H and 92H.

The leakage current detection circuit 13H operates in the following manner. When a leakage current develops between one of the conductors 41H and 42H and the shield 47H, a current flows through the light emitting devices 112H and 113H. The current flows through the light emitting devices 112H and 113H illuminates light emitting devices 112H and 113H to actuate the photosensitive switch 111H into a conductive state.

Conduction of photosensitive switch 111H causes conduction of thyristor 73H to open disconnect switch 50H and to terminate current flow through the first and second electrical blade 21H and 22H to the load 45H.

Figure 17:
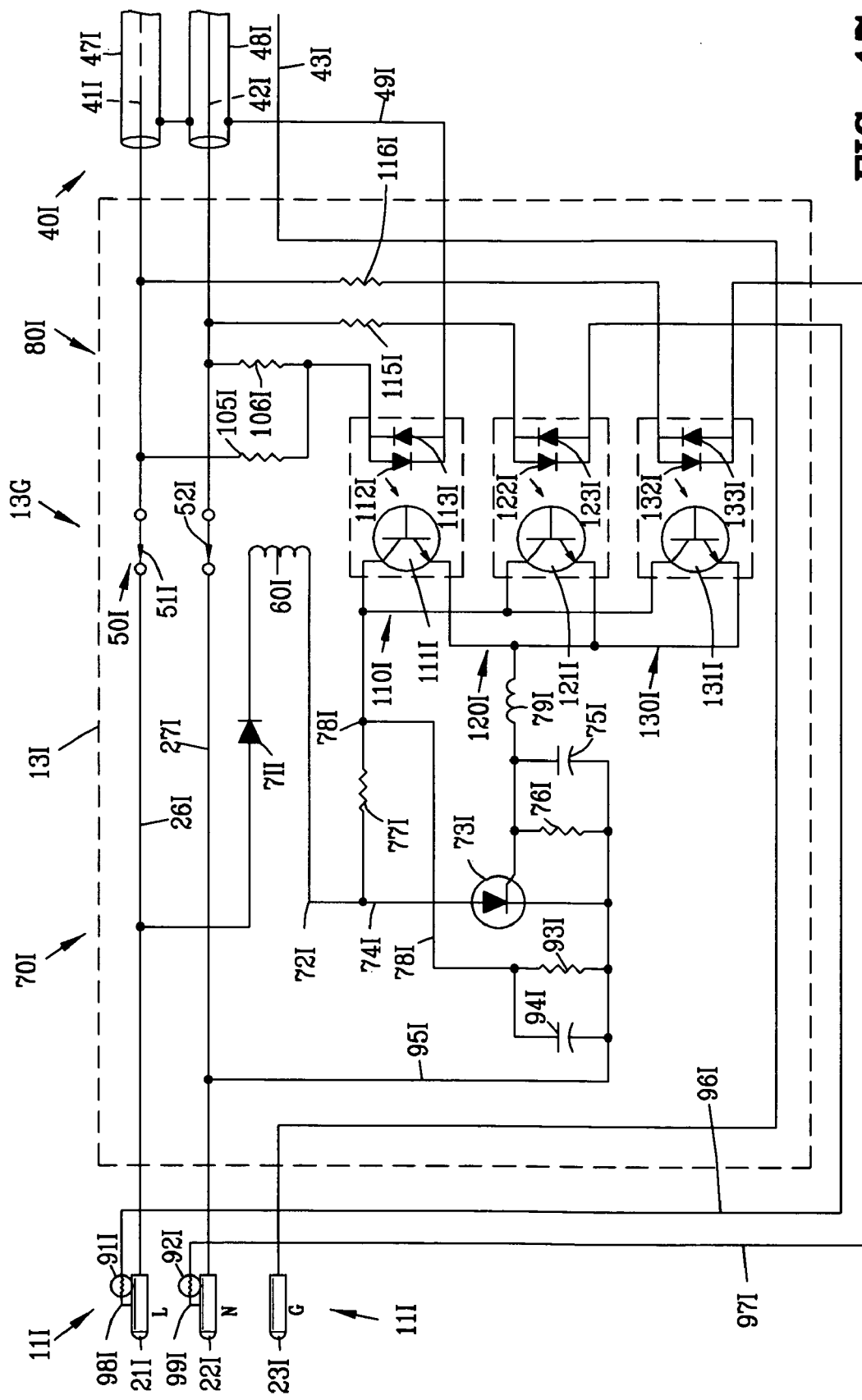
FIG. 17 is a detailed circuit diagram of the block diagram of FIG. 15.

FIG. 17 is a detailed circuit diagram of the block diagram of FIG. 15 illustrating the over heating detection circuit 11I and the leakage current detection circuit 13I. The leakage current detection circuit 13I functions to interrupt the electrical power upon the over heating detection circuit 11I detecting an over heated condition. Similar components are labeled with similar reference numerals with the sequential alphabetical character I.

A primary circuit 70I is located on the left side of the disconnect switch 50I whereas a secondary circuit 80I is located on the right side of the disconnect switch 50I. The disconnect switch 50I comprises a first and a second switch 51I and 52I operating in unison.

In this embodiment, the conductor 41I is surrounded by a shield 47I for sensing any leakage current from conductor 41I. Similarly, the conductor 42I is surrounded by a shield 48I for sensing any leakage current from conductor 42I. The shields 47I and 48I are connected by conductor 49I into the leakage current detection circuit 13I.

The leakage current detection circuit 13I is shown enclosed by the dashed lines in FIG. 15. A diode 71I is connected to the conductor 26I of the primary circuit 70I to provide power for the leakage current detection circuit 13I. The diode 71I provides power through the solenoid coil 60I of disconnect switch 50I to a conductor 72I. The conductor 72I is connected to a switch shown as a thyristor 73I through a conductor 74I. A capacitor 75I and a resistor 76I are connected in parallel at the gate of the thyristor 73I. The conductor 72I is connected through a resistor 77I and a conductor 78I to a resistor 93I. A capacitor 94I is located in parallel with the resistor 93I. A conductor 95I provides a return path to the conductor 27I for the interruption circuit 12I.

The leakage current detection circuit 13I comprises optocoupler 110I. The optocoupler 110I comprises light emitting devices 112I and 113I optically coupled to a photosensitive switch 111I. A divider circuit comprising resistors 105I and 106I is connected between the conductors 41I and 42I. The junction of resistors 105I and 106I is connected through the light emitting devices 112I and 113I and conductor 49I to the shield 47I of the power cable 40I. The collector of the photosensitive switch 111I is connected to the conductor 78I whereas the emitter of the photosensitive switch 111I is connected through a coil 79I to the gate of the thyristor 73I.

The over heating detection circuit 11I comprises a first and a second heat sensitive device 91I and 92I operating in combination with optocouplers 120I and 130I. The first heat sensitive device 91I is connected in series with a resistor 115I and light emitting devices 122I and 123I of the optocouplers 120I by conductors 96I and 98I. Conductor 98I is connected directly to the first blade 21I of the primary circuit 70I whereas conductor 96I is connected to conductor 42 of the secondary circuit 89I. The second heat sensitive device 92I is connected in series with a resistor 116I and light emitting devices 132I and 133I of the optocouplers 130I by conductors 97I and 99I. Conductor 99I is connected directly to the second blade 22I of the primary circuit 70I whereas conductor 98I is connected to conductor 41I of the secondary circuit 80I.

When the first and second electrical blades 21I and 22I are inserted into the power source receptacle 30 shown in FIG. 1, a conventional current flows from the conductor 26I through diode 71I and coil 60I to continue through the resistors 77I and 93I to provide operating voltage to the collectors of the photosensitive switches 111I and 121I on conductor 78I. This conventional current flow from the conductor 26I through diode 71I and coil 60I and the resistors 77I and 93I is insufficient to enable coil 60I to open disconnect switch 50I.

A conventional current flows through the first heat sensitive devices 91I and series resistor 115I and light emitting devices 122I and 123I of the optocouplers 120I through conductors 96I and 98I. Under normal operating temperature conditions, the resistance of the first heat sensitive device 91I and series resistor 115I produce a current through light emitting devices 122I and 123I that is insufficient to illuminate light emitting devices 122I and 123I.

A conventional current flows through the second heat sensitive device 92I and series resistor 116I and light emitting devices 132I and 133I of the optocouplers 130I through conductors 97I and 99I. Under normal operating temperature conditions, the resistance of the second heat sensitive device 92I and series resistor 116I produce a current through light emitting devices 132I and 133I that is insufficient to illuminate light emitting devices 132I and 133I.

In the event the first electrical blade 21I undergoes an undesirable overheated condition, the resistance of the first heat sensitive device 91I is reduced thereby increasing the current through light emitting devices 122I and 123I. The increased current flow through light emitting devices 122I and 123I illuminates light emitting devices 122I and 123I to actuate the photosensitive switch 121I into a conductive state.

In the event the second electrical blade 22I undergoes an undesirable overheated condition, the resistance of the second heat sensitive device 92I is reduced thereby increasing the current through light emitting devices 132I and 133I. The increased current flow through light emitting devices 132I and 133I illuminates light emitting devices 132I and 133I to actuate the photosensitive switch 131I into a conductive state.

Conduction of either the photosensitive switch 121I or photosensitive switch 131I causes conduction of thyristor 73I. The conduction of thyristor 73I results in a current flow through coil 60I to open disconnect switch 50I. The opening of the disconnect switch 50I terminates current flow through the first and second electrical blade 21I and 22I to the load 45I.

The leakage current detection circuit 13I operates in the following manner. When a leakage current develops between one of the conductors 41I and 42I and the shield 47I, a current flows through the light emitting devices 112I and 113I. The current flow through the light emitting devices 112I and 113I illuminates light emitting devices 112I and 113I to actuate the photosensitive switch 111I into a conductive state. Conduction of photosensitive switch 111I causes conduction of thyristor 73I to open disconnect switch 50I and to terminate current flow through the first and second electrical blade 21I and 22I to the load 45I.

Figure 18:
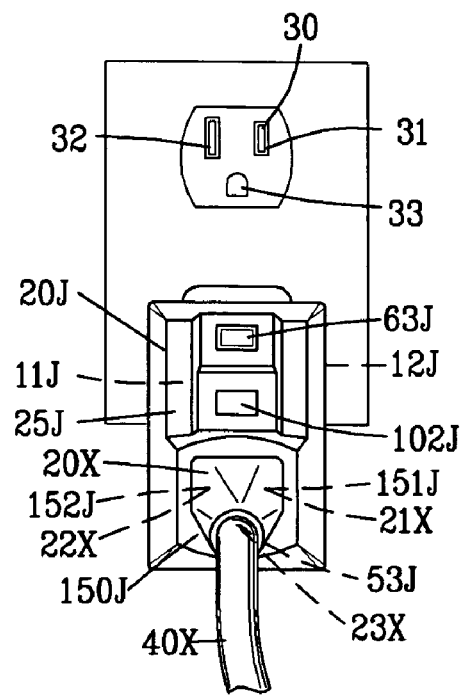
FIG. 18 is an eighth embodiment of an over heating detection and interrupter circuit of the present invention incorporated into an electrical outlet adapter.

FIG. 18 is an elevational view of the over heating detection circuit 11J and an interruption circuit 12J of the present invention incorporated into an electrical outlet adapter 20J. The electrical outlet adapter 20J disconnects power from a power source upon the detection of an over heated condition in either the electrical outlet adapter 20J or a conventional electrical plug 20X. The electrical outlet adapter 20J comprises an outlet adapter housing 25J for receiving the over heating detection circuit 11J and the interruption circuit 12J within the outlet adapter housing 25J. The electrical outlet adapter 20J is shown inserted into a conventional 120 volt power source receptacle 30. The conventional electrical plug 20X is shown inserted into the electrical outlet adapter 20J.

Although the electrical outlet adapter 20J has been shown as a conventional 120 volt United States electrical outlet adapter, it should be understood that the present invention may be used with the 240 volt United States electrical outlet adapter or a foreign electrical outlet adapter.

Figure 19:
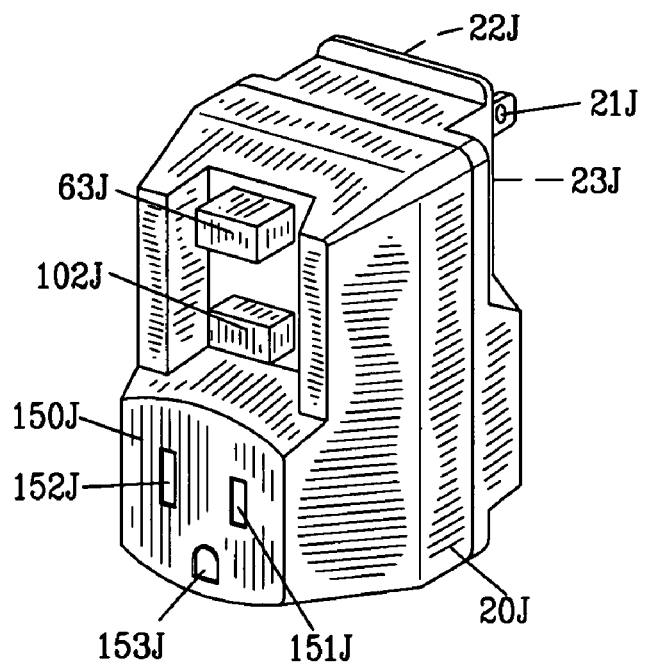
FIG. 19 is an enlarged isometric view of the electrical outlet adapter of FIG. 18.
Figure 20:
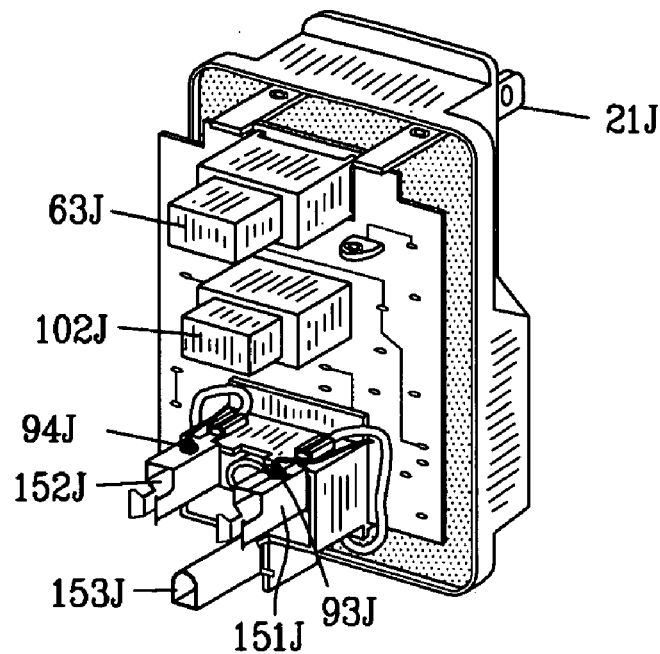
FIG. 20 is an interior view of the electrical outlet adapter of FIG. 19.
Figure 21:
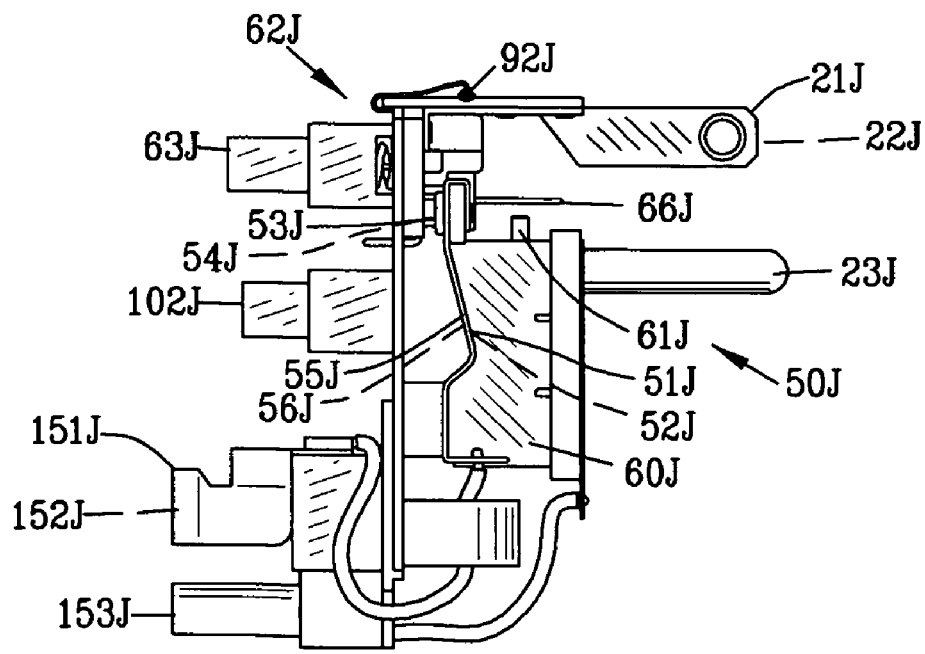
FIG. 21 is an enlarged sectional view of the disconnect switch of FIG. 20.

FIGS. 19-21 further illustrate the electrical outlet adapter 20J shown in FIG. 18. The electrical outlet adapter 20J includes a first and a second electrical blade 21J and 22J and a ground lug 23J. The first and second electrical blades 21J and 22J and the ground lug 23J extend from the outlet adapter housing 25J for insertion into the first and second electrical slot 31 and 32 and a ground aperture 33 of the electrical receptacle 30 of FIG. 18. The first electrical blade 21J is the line terminal whereas the second electrical blade 22J is the neutral terminal.

The electrical outlet adapter 20J includes an electrical receptacle 150J. The electrical receptacle 150J include a first and a second electrical slot 151J and 152J and a ground aperture 153J. The first and second electrical slot 151J and 152J and the ground aperture 153J are adapted to receive a first and a second electrical blade 21X and 22X and a ground lug 23X of the conventional electrical plug 20X. The first and second electrical slots 151J and 152J and the ground aperture 153J of the electrical receptacle 150J are resilient metallic connector slots for providing a resilient mechanical engagement with the first and second electrical blades 21X and 22X and the ground lug 23X of the conventional electrical plug 20X.

FIGS. 20 and 21 illustrate interior views of electrical outlet adapter 20J of FIGS. 18 and 19 with a disconnect switch 50J of the interruption circuit 12J shown in a closed position. The disconnect switch 50J is identical to the disconnect switch 50 shown in FIGS. 3-6 and described previously.

The disconnect switch 50J comprises a first and a second switch 51J and 52J shown as resilient relay contacts 53J and 54J mounted on resilient metallic conductors 55J and 56J. The disconnect switch 50J includes a solenoid coil 60J for operating a plunger 61J. A latch 62J is a mechanical latch comprising a reset button 63J having a return spring 64J.

Figure 22:
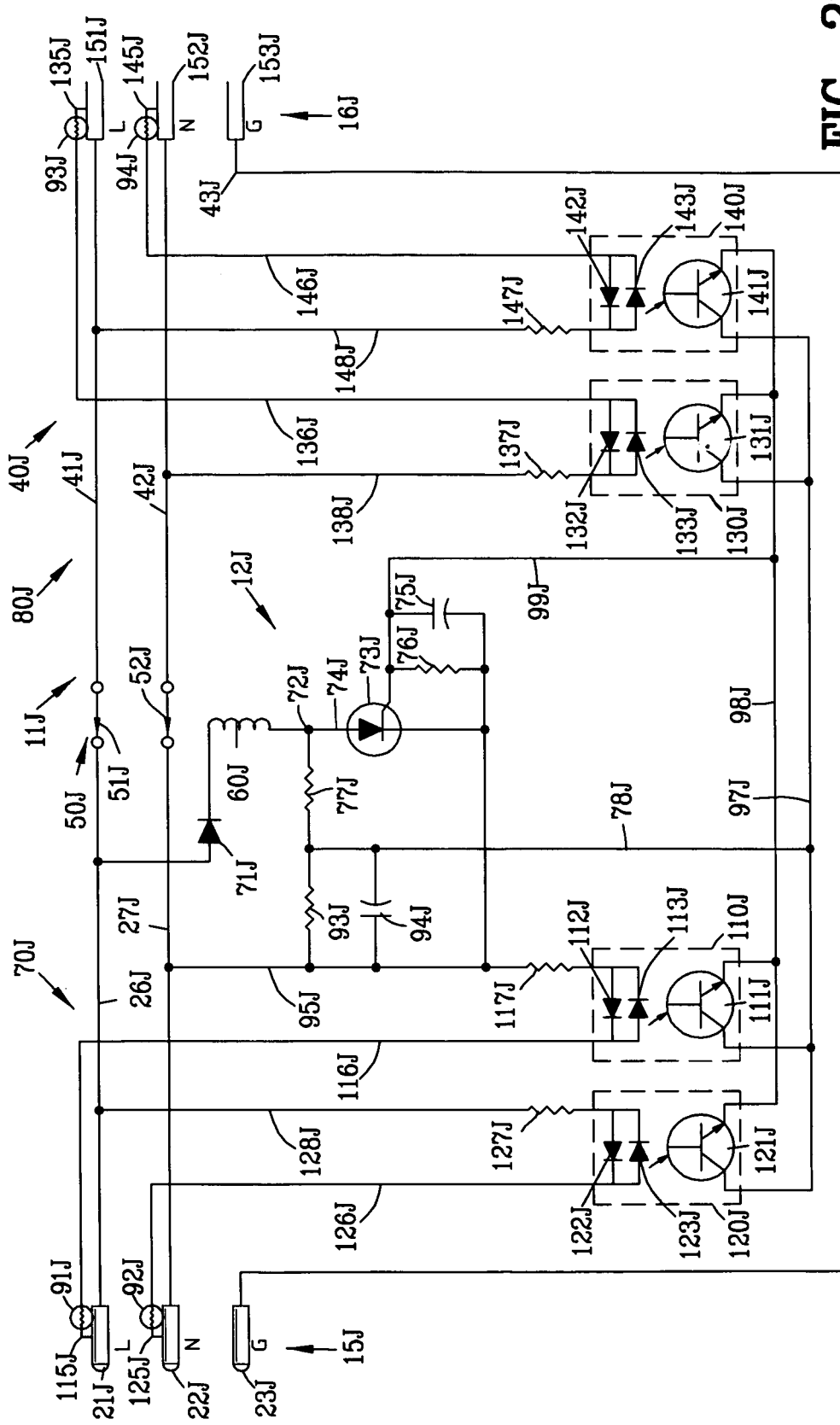
FIG. 22 is a circuit diagram of the over heating detection and interrupter circuit of the electrical outlet adapter of FIGS. 19-22.

FIG. 22 is a circuit diagram of the over heating detection circuit 11J and an interruption circuit 12J of the present invention incorporated into an electrical outlet adapter 20J. The interruption circuit 12J functions to interrupt the electrical power upon the over heating detection circuit 11J detecting an over heated condition. Similar components are labeled with similar reference numerals with the sequential alphabetical character J.

A primary circuit 70J is located on the left side of the disconnect switch 50J whereas a secondary circuit 80J is located on the right side of the disconnect switch 50J. The disconnect switch 50J comprises a first and a second switch 51J and 52J operating in unison. The first and a second blade 21J and 22J are connected by conductors 26J and 27J to the disconnect switch 50J in the primary circuit 70J. The disconnect switch 50J is connected to a first and a second electrical slot 151J and 152J by conductors 41J and 42J.

A diode 71J is connected to the conductor 26J of the primary circuit 70J to provide power for the interruption circuit 12J. The diode 71J provides power through the solenoid coil 60J of disconnect switch 50J to a conductor 72J. The conductor 72J is connected to a switch shown as a thyristor 73J through a conductor 74J. A capacitor 75J and a resistor 76J are connected in parallel at the gate of the thyristor 73J. The conductor 72J is connected to resistor 77J, conductor 78J and resistor 93J. A capacitor 94J is located in parallel with the resistor 93J. A conductor 95J provides a return path to the conductor 27J for the interruption circuit 12J.

The over heating detection circuit 11J comprises a primary over heating detection circuit 15J and a secondary over heating detection circuit 16J. The primary over heating detection circuit 15J detects an over heating condition in the first and second blades 21J and 22J. The secondary over heating detection circuit 16J detects an over heating condition in the first and second electrical slot 151J and 152J.

The primary over heating detection circuit 15J comprises a first and a second heat sensitive device 91J and 92J operating in combination with optocouplers 110J and 120J for detecting an overheated condition of the first and second blades 21J and 22J. The first and second heat sensitive devices 91J and 92J are in thermal contact with the first and second blades 21J and 22J. The optocoupler 110J includes light emitting devices 112J and 113J optically coupled to a photosensitive switch 111J whereas the optocoupler 120J includes light emitting devices 122J and 123J optically coupled to a photosensitive switch 121J.

The first heat sensitive device 91J is connected in series with light emitting devices 112J and 113J. Conductor 115J connects the first heat sensitive device 91J directly to the first blade 21J of the primary circuit 70J whereas conductor 116J connects the first heat sensitive device 91J to the light emitting devices 112J and 113J. Conductor 95J connects the light emitting devices 112J and 113J through a resistor 117J to the conductor 26J through conductor 95J.

The second heat sensitive device 92J is connected in series with light emitting devices 122J and 123J. Conductor 125J connects the second heat sensitive device 92J directly to the second blade 22J of the primary circuit 70J whereas conductor 126J connects the second heat sensitive device 92J to the light emitting devices 122J and 123J. Conductor 128J connects the light emitting devices 122J and 123J through a resistor 127J to the conductor 26J.

The secondary over heating detection circuit 16J comprises a third and a fourth heat sensitive device 93J and 94J operating in combination with optocouplers 130J and 140J for detecting an overheated condition of the first and second electrical slots 151J and 152J. The third and fourth heat sensitive devices 93J and 94J are in thermal contact with the first and second electrical slots 151J and 152. The optocoupler 130J includes light emitting devices 132J and 133J optically coupled to a photosensitive switch 131J whereas the optocoupler 140J includes light emitting devices 142J and 143J optically coupled to a photosensitive switch 141J.

The third heat sensitive device 93J is connected in series with light emitting devices 132J and 133J. Conductor 135J connects the third heat sensitive device 93J directly to the first electrical slot 151J of the secondary circuit 80J whereas conductor 136J connects the third heat sensitive device 93J to the light emitting devices 132J and 133J. Conductor 138J connects the light emitting devices 132J and 133J through a resistor 137J to the conductor 42J.

The fourth heat sensitive device 941J is connected in series with light emitting devices 142J and 143J. Conductor 145J connects the fourth heat sensitive device 94J directly to the second electrical slot 152J of the secondary circuit 80J whereas conductor 146J connects the fourth heat sensitive device 94J to the light emitting devices 142J and 143J. Conductor 148J connects the light emitting devices 142J and 143J through a resistor 147J to the conductor 41J.

The collectors of photosensitive switch 111J, 121J, 131J and 141J are connected by a conductor 97J to the conductor 78J. The emitters of photosensitive switch 111J, 121J, 131J and 141J are connected by conductors 98J and 99J to the gate of the thyristor 73J.

When the first and second electrical blades 21J and 22J are inserted into the power source receptacle 30 shown in FIG. 1, electrical power is applied at the first and second electrical slots 151J and 152J. A conventional current flows from the conductor 26J through diode 71J and coil 60J to continue through the resistors 77J and 93J to conductor 27J through conductor 95J. This conventional current flow from the conductor 26J through diode 71J and coil 60J and the resistors 77J and 93J is insufficient to enable coil 60J to open disconnect switch 50J.

In the primary over heating detection circuit 15J, a conventional current flows through the first heat sensitive device 91J and series resistor 117J and light emitting devices 112J and 113J of the optocouplers 110J. Under normal operating temperature conditions, the resistance of the first heat sensitive device 91J and series resistor 117J produce a current through light emitting devices 112J and 113J that is insufficient to illuminate light emitting devices 112J and 113J.

Similarly, conventional current flows through the second heat sensitive device 92J and series resistor 127J and light emitting devices 122J and 123J of the optocouplers 120J. Under normal operating temperature conditions, the resistance of the second sensitive device 92J and series resistor 127J produce a current through light emitting devices 122J and 123J that is insufficient to illuminate light emitting devices 122J and 123J.

In the secondary over heating detection circuit 16J, a conventional current flows through the third heat sensitive device 93J and series resistor 137J and light emitting devices 132J and 133J of the optocouplers 130J. Under normal operating temperature conditions, the resistance of the first heat sensitive device 93J and series resistor 137J produce a current through light emitting devices 132J and 133J that is insufficient to illuminate light emitting devices 132J and 133J.

Similarly, conventional current flows through the fourth heat sensitive device 94J and series resistor 147J and light emitting devices 142J and 143J of the optocouplers 140J. Under normal operating temperature conditions, the resistance of the second sensitive device 94J and series resistor 147J produce a current through light emitting devices 142J and 143J that is insufficient to illuminate light emitting devices 142J and 143J.

The primary over heating detection circuit 15J interrupts electrical power upon an over heated condition in the either of the first and second electrical blades 21J and 22J. In the event the first electrical blade 21J undergoes an undesirable overheated condition, the resistance of the first heat sensitive device 91J is reduced thereby increasing the current through light emitting devices 112J and 113J. The increased current flow through light emitting devices 112J and 113J illuminates light emitting devices 112J and 113J to actuate the photosensitive switch 111J into a conductive state.

In the event the second electrical blade 22J undergoes an undesirable overheated condition, the resistance of the second heat sensitive device 92J is reduced thereby increasing the current through light emitting devices 122J and 123J. The increased current flow through light emitting devices 122J and 123J illuminates light emitting devices 122J and 123J to actuate the photosensitive switch 121J into a conductive state.

Conduction of either the photosensitive switch 111J or photosensitive switch 121J causes conduction of thyristor 73J. The conduction of thyristor 73J results in a current flow through coil 60J to open disconnect switch 50J. The opening of the disconnect switch 50J terminates current flow through the first and second electrical blade 21J and 22J to the first and second electrical slots 151J and 152J.

The secondary over heating detection circuit 16J interrupts electrical power upon an over heated condition in the either of the first and second electrical slots 151J and 152J. In the event the first electrical slot 151J undergoes an undesirable overheated condition, the resistance of the third heat sensitive device 93J is reduced thereby increasing the current through light emitting devices 132J and 133J. The increased current flow through light emitting devices 132J and 133J illuminates light emitting devices 132J and 133J to actuate the photosensitive switch 131J into a conductive state.

In the event the second electrical slot 152J undergoes an undesirable overheated condition, the resistance of the fourth heat sensitive device 94J is reduced thereby increasing the current through light emitting devices 142J and 143J. The increased current flow through light emitting devices 142J and 143J illuminates light emitting devices 142J and 143J to actuate the photosensitive switch 141J into a conductive state.

Conduction of either the photosensitive switch 131J or photosensitive switch 141J causes conduction of thyristor 73J. The conduction of thyristor 73J results in a current flow through coil 60J to open disconnect switch 50J. The opening of the disconnect switch 50J terminates current flow through electrical blade 21J and 22J to the first and second electrical slots 151J and 152J.

Figure 23:
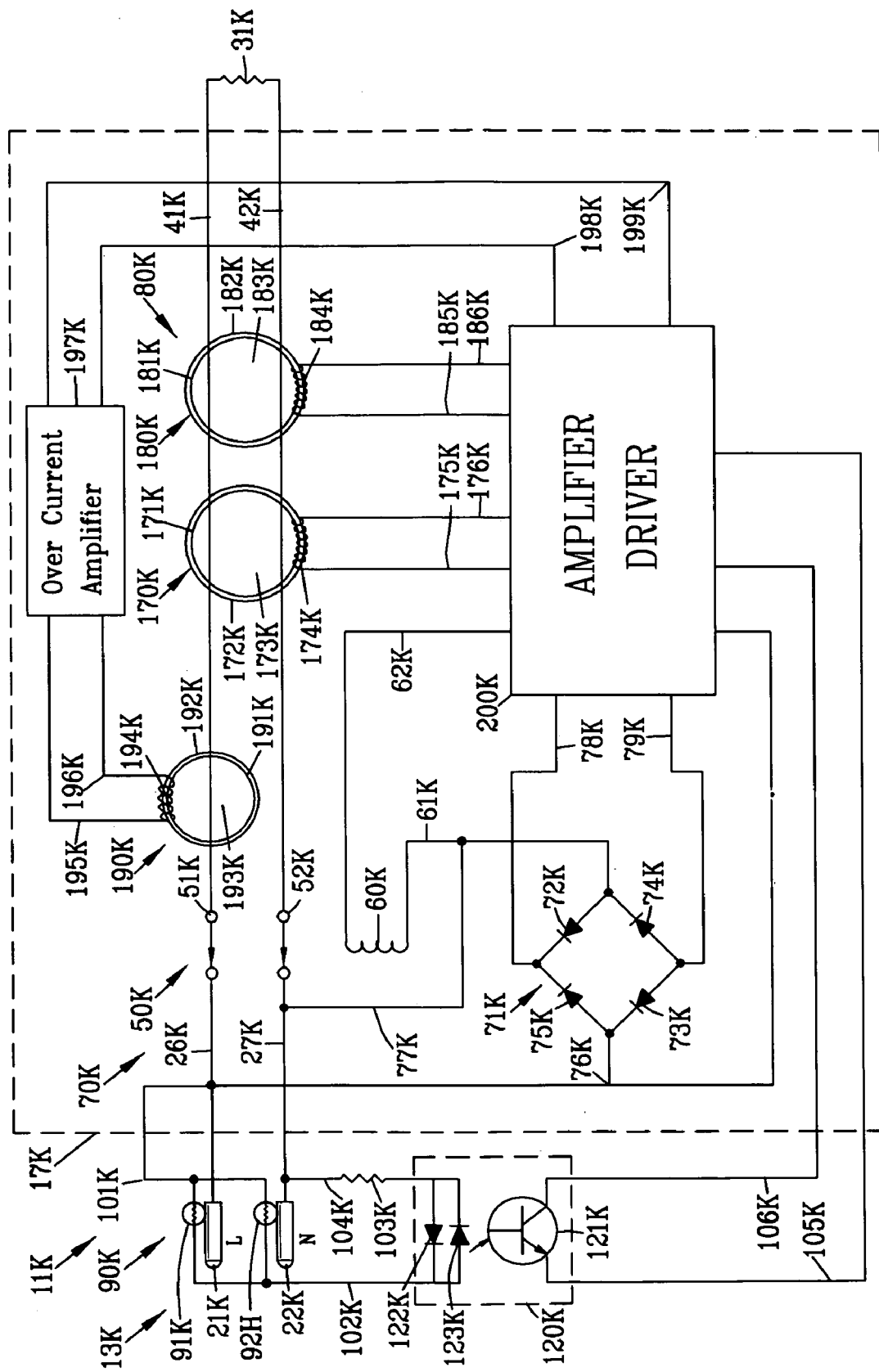
FIG. 23 is an ninth embodiment of an over heating detection and interrupter circuit of the present invention incorporated into a ground fault circuit interrupter and an over current sensing circuit.

FIG. 23 is a ninth embodiment of an over heating detection and interrupter circuit 13K of the present invention incorporated into a ground fault circuit interrupter 17K. The over heating detection and interrupter circuit 13K functions to interrupt the electrical power upon the over heating detection circuit 11K detecting an over heated condition. The ground fault circuit interrupter 17K functions to interrupt the electrical power upon an imbalance between the current flow to and from the load 31K. Similar components are labeled with similar reference numerals with the sequential alphabetical character K.

A primary circuit 70K is located on the left side of the disconnect switch 50K whereas a secondary circuit 80K is located on the right side of the disconnect switch 50K. The disconnect switch 50K comprises a first and a second switch 51K and 52K operating in unison. The ground fault circuit interrupter 17K is shown enclosed by the dashed lines in FIG. 23.

The primary circuit 70K includes a full wave rectifier bridge 71K comprising diodes 72K-75K connected between the conductors 26K and 27K by connectors 76K and 77K. The full wave rectifier bridge 71K supplies a pulsating DC voltage to an amplifier-driver 200K by connectors 78K and 79K. The solenoid coil 60K of the disconnect switch 50 is connected between the conductor 22K and the amplifier driver 200K by connectors 61K and 62K. The operation of the amplifier-driver 200K will be described in greater detail hereinafter.

The over heating detection circuit 11K comprises a first and a second heat sensitive device 91K and 92K. The first and second heat sensitive devices 91K and 92K are located in thermal contact with the first and second electrical blades 21K and 22K.

The first and second heat sensitive devices 91K and 92K are connected to the first conductor 26K by a connector 101K. A connector 102K connects the first and second heat sensitive devices 91K and 92K to one side of an optocoupler 120K. A resistor 103K and a connector 104K connect the other side of the optocoupler 120K to the second conductor 27K. The optocoupler 120K comprises light emitting devices 122K and 123K optically coupled to a photosensitive switch 121K.

When the first and second electrical blades 21K and 22K are inserted into the power source receptacle 30 shown in FIG. 1, a conventional current flows through the first and second heat sensitive devices 91K and 92K and the light emitting devices 122K and 123K and the series resistor 103K. Under normal operating temperature conditions, the resistance of the first and second heat sensitive devices 91K and 92K and series resistor 103K produce a current that is insufficient to illuminate light emitting devices 122K and 123K.

In the event one of the first and second electrical blade 21K and 22K undergoes an undesirable overheated condition, than the resistance of the respective first and second heat sensitive devices 91K and 92K is reduced thereby increasing the current flow through one of the light emitting devices 122K and 123K. The increasing in the current flow illuminates one of the light emitting devices 122K and 123K to actuate the photosensitive switch 121K into a conductive state.

Conduction of the photosensitive switch 121K causes current to flow through conductors 105K and 106K to the amplifier-driver 200K. The amplifier driver 200K enables conduction of the current from the conductor 27K through connector 61K, solenoid coil 60K, connector 62K and connector 76K to the conductor 26K. The current flow through solenoid coil 60K opens the disconnect switch 50K. The opening of the disconnect switch 50K terminates current flow through the first and second electrical blade 21K and 22K to the load 45K.

The ground fault circuit interrupter 17K comprises a sensing circuit 170K having a current sensing transformer 171K comprising a transformer core 172K having a core opening 173K. The conductors 41K and 42K extend through the core opening 173K of the transformer core 172K to function as primary windings of the current sensing transformer 171K.

A secondary winding 174K is wound about the transformer core 173K of the current sensing transformer 171K. The secondary winding 174K is connected to the amplifier-driver 200K by connectors 175K and 176K.

In the event of an imbalance between the current flow through the conductor 41K and the conductor 42K, the imbalance of current flow will produce a magnetic flux in the transformer core 172K. Any magnetic flux induced in the transformer core 172K will produce a voltage across the secondary winding 174K. The voltage across the secondary winding 174K is connected to the amplifier-driver 200K by connectors 175K and 176K. The amplifier driver 200K enables conduction of current from the conductor 27K through connector 61K, solenoid coil 60K connector 62K and connector 76K to the conductor 26K. The current flow through solenoid coil 60K opens the disconnect switch 50K and terminates current flow through the first and second electrical blade 21K and 22K to the load 31K.

FIG. 23 includes an optional ground neutral sensing circuit 180K comprising a sensing circuit 180 having a current sensing transformer 181K comprising a transformer core 182K having a core opening 183K. The conductors 41K and 42K extend through the core opening 183K of the transformer core 182K to function as primary windings of the current sensing transformer 181K.

A secondary winding 184K is wound about the transformer core 183K of the current sensing transformer 181K. The secondary winding 184K is connected to the amplifier-driver 200K by connectors 185K and 186K.

In the event of a ground current flow in a ground circuit (not shown), the ground current flow will produce a magnetic flux in the transformer core 182K. Any magnetic flux induced in the transformer core 182K will produce a voltage across the secondary winding 184K will be applied to the amplifier-driver 200K by connectors 185K and 186K. The amplifier driver 200K enables conduction of current from the conductor 27K through connector 61K solenoid coil 60K, connector 62K and connector 76K to the conductor 26K. The current flow through solenoid coil 60K opens the disconnect switch 50K and terminates current flow through the first and second electrical blade 21K and 22K to the load 31K.

FIG. 23 includes an optional over current sensing circuit 190K comprising a sensing circuit 190 having a current sensing transformer 191K comprising a transformer core 192K having a core opening 193K. The sole conductor 41K extends through the core opening 193K of the transformer core 192K to function as primary windings of the current sensing transformer 191K.

A secondary winding 194K is wound about the transformer core 193K of the current sensing transformer 191K. The secondary winding 194K is connected by connectors 195K and 196K to an over current amplifier 197K. An output of the over current amplifier 197K is connected by connectors 198K and 199K to the amplifier-driver 200K.

In the event of a current flow through sole conductor 41K exceeds a predetermine value as determined by the over current amplifier 197K, the over current amplifier 197K provides an output signal to the amplifier-driver 200K. The amplifier driver 200K enables conduction of current from the conductor 27K through connector 61K, solenoid coil 60K, connector 62K and connector 76K to the conductor 26K. The current flow through solenoid coil 60K opens the disconnect switch 50K and terminates current flow through the first and second electrical blade 21K and 22K to the load 31K.

Figure 24:
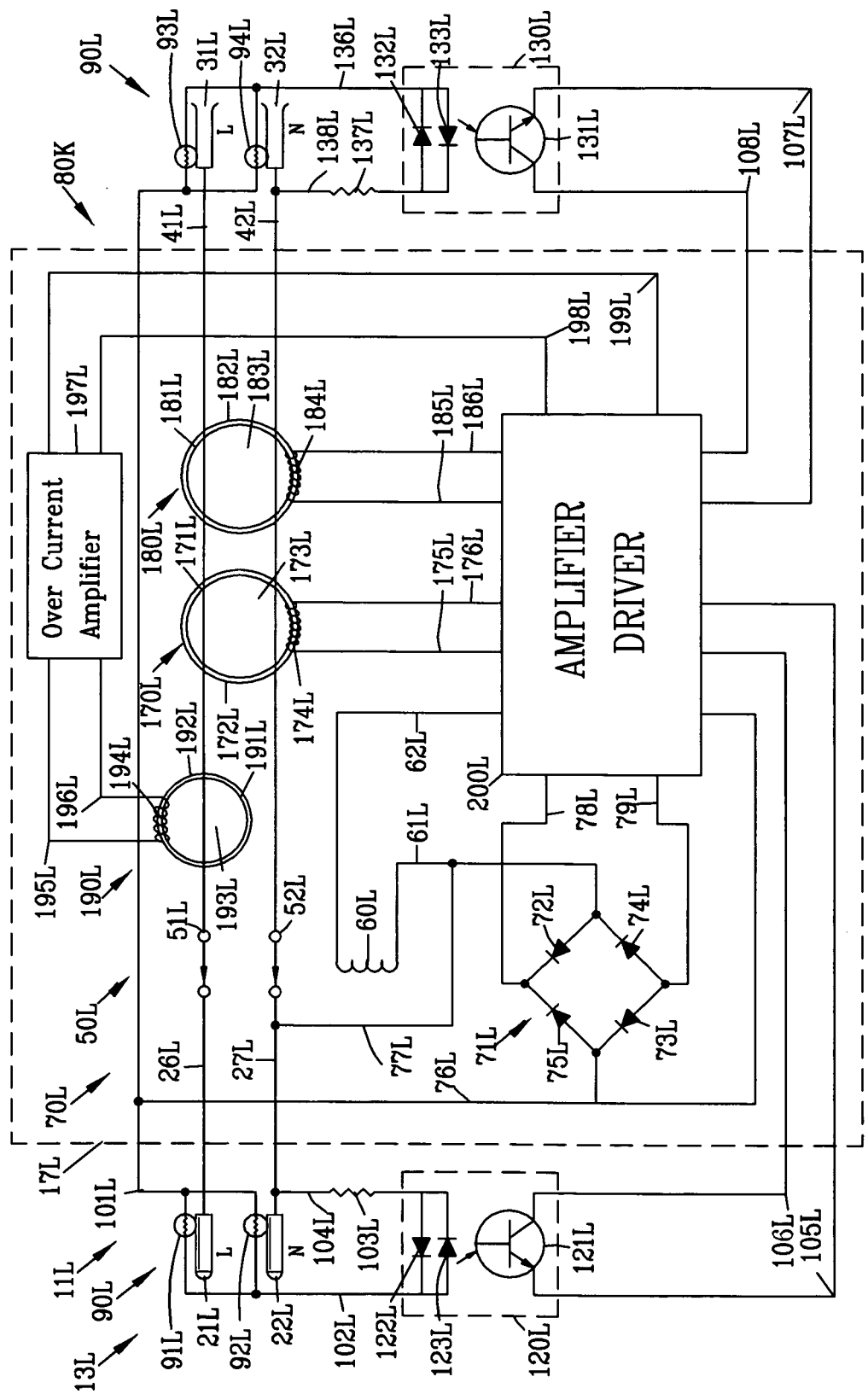
FIG. 24 is a tenth embodiment of an over heating detection and interrupter circuit of the present invention incorporated into a ground fault circuit interrupter an over current sensing circuit.

FIG. 24 is a tenth embodiment of an over heating detection and interrupter circuit 13L of the present invention incorporated into a ground fault circuit interrupter 17L. The circuit shown in FIG. 24 is similar to the circuit shown in FIG. 23 with similar components are labeled with similar reference numerals with the sequential alphabetical character L.

In this embodiment of the invention, the circuit includes a first over heating detection circuit 13L and a second over heating detection circuit 13L and first over heating detection circuit 13L comprises a first and a second heat sensitive device 91L and 92L located in thermal contact with the first and second electrical blades 21L and 22L. The second over heating detection circuit 13L and comprises a heat sensitive device 93L and 94L located in thermal contact with the receptacle sockets 31L and 32L. The second over heating detection circuit 13L and operates in a manner similar to the operation of the first over heating detection circuit 13L as should be apparent to those skilled in the art.

Figure 25:
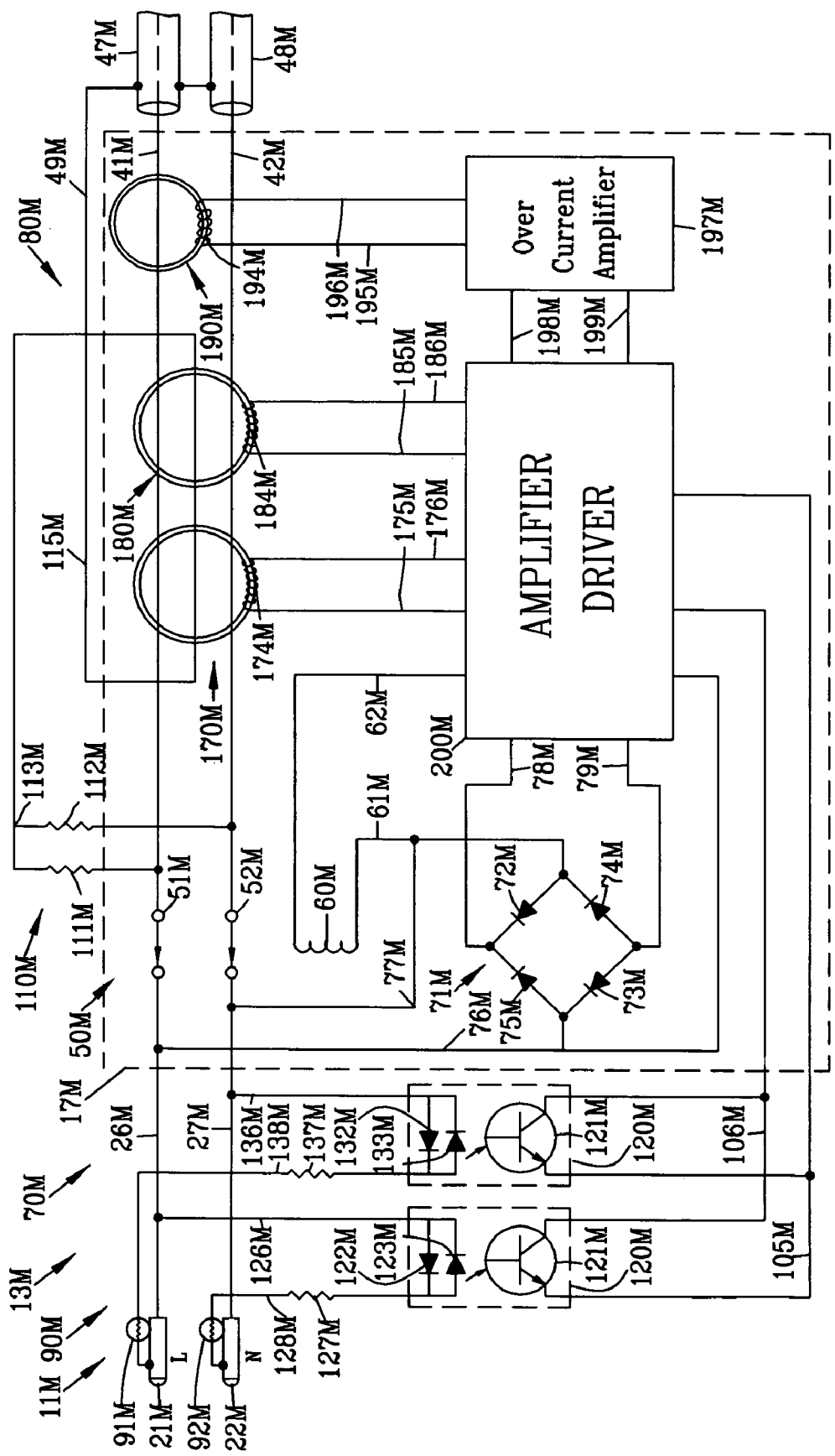
FIG. 25 is an eleventh embodiment of an over heating detection and interrupter circuit of the present invention incorporated into a ground fault circuit interrupter and a leakage current sensing circuit and an over current sensing circuit.

FIG. 25 is an eleventh embodiment of an over heating detection and interrupter circuit 13M of the present invention incorporated into a ground fault circuit interrupter 17M as well as a leakage current detection interruption circuit 11M.

The over heating detection circuit 13M operates in a manner similar to FIG. 24 with the individual sensing of the temperatures of the first and second electrical blades 21M and 22M as fully explained with reference to FIG. 22.

In this embodiment of the invention, the leakage current detection interruption circuit 11M comprises a voltage divider network 110M comprising resistors 111M and 112M connected between the first and second conductors 41M and 42M. A node 113M of the voltage divider network 115 is connected to a conductor 115 extending through the core opening 173M of the transformer core 172M to attach to a conductor 49M connected to the first and second shields 47M and 48M surrounding conductors 41M and 42M. The conductor 115M functions as an additional primary windings of the sensing transformer 171M.

In the event of a leakage current flow between one of the first and second conductors 41M and 42M and one of the first and second shields 47M and 48M, a current will flow through the conductor 115M extending through the core opening 173M of the transformer core 172M. The current flow through the conductor 108 produces a magnetic flux in the transformer core 172M enabling the amplifier driver 200M to open the disconnect switch 50M and terminates current flow as heretofore described.

FIG. 26 is a twelfth embodiment of an over heating detection sensor 90N circuit and interrupter circuit 12N of the present invention incorporating a wireless network 100N. The over heating detection sensor circuit 90N is incorporated into the housing 25N of the plug 20N. A wireless transmitter 101N is located within the housing 25N of the plug 20N and connected to the heating detection sensor circuit 90N.

The interrupter circuit 12N is incorporated into the electrical device 31N. A wireless receiver 101N is located within the electrical device 31N. The wireless receiver 102N is connected to a switch actuator 105N for actuating electrical device switch 50N.

In the event one of the first and second electrical blade 21N and 22N undergoes an undesirable overheated condition, than the temperature sensor 90N initiates transmission of a wireless signal of the wireless transmitter 101N as indicated by the dashed lines. The wireless receiver 102N intercepts the wireless signal from the wireless transmitter 101N and actuates a switch actuator 105N to open electrical device switch 50N. It should be understood by those skilled in the art that the wireless network 100N and be virtually any type of wireless communication.

FIG. 27 is a thirteenth embodiment of an over heating detection sensor 90O circuit and interrupter circuit 12O of the present invention incorporating a pulse network 100O. The over heating detection sensor circuit 90O is incorporated into the housing 25O of the plug 20O. A pulse transmitter 101O is located within the housing 25O of the plug 20O and connected to the heating detection sensor circuit 90O.

The interrupter circuit 12O is incorporated into the electrical device 31O. A pulse receiver 101O is located within the electrical device 31O. The pulse receiver 102O is connected to a switch actuator 105O for actuating electrical device switch 50O.

In the event one of the first and second electrical blade 21O and 22O undergoes an undesirable overheated condition, than the temperature sensor 90O initiates transmission of a pulse signal of the pulse transmitter 101O over the cable assembly 40O as indicated by the sine wave. The pulse receiver 102O intercepts the pulse signal from the pulse transmitter 101O and actuates a switch actuator 105O to open electrical device switch 50O. It should be understood by those skilled in the art that the pulse network 100O and be virtually any type of pulse communication.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An over heating detection and interrupter circuit for detecting an over heating condition of an electrical plug having a first and a second electrical blades inserted into slots of a power source receptacle, comprising:
   a first and a second thermistor mounted directly to the first and second electrical blades for monitoring the temperature of the electrical plug;
   an over heating detection circuit connected to said first and second thermistors for detecting an over heated condition in the electrical plug; and
   an interruption circuit having a disconnect switch connected to said over heating detection circuit for disconnecting electrical power upon the detection of an over heated condition in the electrical plug.

2. An over heating detection and interrupter circuit as set forth in claim 1, wherein each of said first and second thermistors provides an electrical output upon detecting said over heated condition in the electrical plug.

3. An over heating detection and interrupter circuit as set forth in claim 1, including a device switch connected in series with said first and second thermistors for connecting and disconnecting powering to said electrical heat sensitive device.

4. An over heating detection and interrupter circuit as set forth in claim 1, wherein said disconnect switch comprises a disconnect switch input circuit connected to the power source and a disconnect switch output circuit connected to the load; and
   said first and second thermistors being connected to said disconnect switch input circuit for powering said electrical heat sensitive device.

5. An over heating detection and interrupter circuit as set forth in claim 1, wherein said disconnect switch comprises a disconnect switch input circuit connected to the power source and a disconnect switch output circuit connected to the load; and
   said first and second thermistors being connected to said disconnect switch output circuit for powering said electrical heat sensitive device.

6. An over heating detection and interrupter circuit as set forth in claim 1, wherein said disconnect switch comprises a disconnect switch input circuit connected to the power source and a disconnect switch output circuit connected to the load;
   said first and second thermistors being connected to said disconnect switch input circuit for powering said electrical heat sensitive device; and
   a heat sensitive device switch interposed between said first and second thermistors and said disconnect switch input circuit for connecting and disconnecting power to said electrical heat sensitive device.

7. An over heating detection and interrupter circuit for detecting an over heating condition of an electrical plug having a first and a second electrical blade inserted into slots of a power source receptacle, comprising:
   a first and a second thermistor mounted directly to the first and second electrical blades for monitoring the temperature of the electrical plug;
   a first and a second optocoupler interconnecting said first and second thermistor to an over heating detection circuit for detecting an over heated condition in the electrical plug; and
   an interruption circuit having a disconnect switch connected to said over heating detection circuit for disconnecting electrical power upon the detection of an over heated condition in the electrical plug.

8. An over heating detection and interrupter circuit as set forth in claim 1, including an optocoupler and heat sensitive device switch located on opposed sides of said first and second thermistors.

9. An over heating detection and interrupter circuit for interrupting electrical power from a power source receptacle to a load upon the detection of an over heating condition of an electrical plug inserted into a first and a second slot of the power source receptacle, comprising:
   an electrical plug housing supporting a first and a second electrical blade for insertion within the first and second slots of the power source receptacle;
   a first and a second thermistor mounted directly to said first and second electrical blades for monitoring the temperature of each of said first and second electrical blades;
   an over heating detection circuit connected to said first and second thermistors for providing an over heating detection circuit electrical output upon the detection of an over heated condition in one of said first and second electrical blades; and
   an interruption circuit having a disconnect switch connected for receiving said over heating detection circuit output for disconnecting electrical power to the load upon said over heating detection circuit detecting an over heated condition in one of said first and second electrical blades.

10. An over heating detection and interrupter circuit as set forth in claim 9, wherein said disconnect switch is located internal to said electrical plug housing.

11. An over heating detection and interrupter circuit as set forth in claim 9, wherein said disconnect switch is located external to said electrical plug housing.

12. An over heating detection and interrupter circuit as set forth in claim 9, wherein said disconnect switch is located as an integral part of the powered load assembly.

13. An over heating detection and interrupter circuit as set forth in claim 9, wherein the communication from the plug to the disconnect switch is either via the power supply cord or via wireless communication.

14. An over heating detection and interrupter circuit as set forth in claim 9, wherein each said first and second thermistors has plural power terminals;
   one of said plural power terminals of said first electrical heat sensitive device being connected to said first electrical blade; and
   one of said plural power terminals of said second electrical heat sensitive device being connected to said second electrical blade.

15. An over heating detection and interrupter circuit for detecting an over heating condition of an electrical plug having an electrical blade inserted into a slot of a power source receptacle, comprising:

an electrical heat sensitive device mounted directly to the first and second electrical blades for monitoring the temperature of the electrical plug;

an over heating detection circuit connected to said electrical heat sensitive device for detecting an over heated condition in the electrical plug;

an optocoupler interposed between said electrical heat sensitive device and said over heating detection circuit for electrically isolating said electrical heat sensitive device from said over heating detection circuit; and an interruption circuit having a disconnect switch connected to said over heating detection circuit for disconnecting electrical power upon the detection of an over heated condition in the electrical plug.

\* \* \* \* \*